(12) United States Patent
Strobel et al.

(10) Patent No.: US 12,129,181 B2
(45) Date of Patent: Oct. 29, 2024

(54) CARBON-BASED CLATHRATE COMPOUNDS

(71) Applicant: Carnegie Institution of Washington, Washington, DC (US)

(72) Inventors: Timothy Strobel, Washington, DC (US); Li Zhu, Washington, DC (US)

(73) Assignee: Carnegie Institution of Washington, Washington, DC (US)

( * ) Notice: Subject to any disclaimer, the term of this patent is extended or adjusted under 35 U.S.C. 154(b) by 0 days.

(21) Appl. No.: 17/951,939

(22) Filed: Sep. 23, 2022

(65) Prior Publication Data

US 2023/0147042 A1 May 11, 2023

Related U.S. Application Data

(63) Continuation of application No. 16/810,388, filed on Mar. 5, 2020, now Pat. No. 11,691,890.

(60) Provisional application No. 62/814,024, filed on Mar. 5, 2019.

(51) Int. Cl.
  *C01F 11/00* (2006.01)
  *C01F 17/30* (2020.01)

(52) U.S. Cl.
  CPC ............. *C01F 17/30* (2020.01); *C01F 11/00* (2013.01); *C01P 2004/38* (2013.01); *C01P 2006/40* (2013.01)

(58) Field of Classification Search
  CPC ........................................................ C01F 11/00
  See application file for complete search history.

(56) References Cited

U.S. PATENT DOCUMENTS 6,461,581 B1 10/2002 Eguchi et al.
2003/0197156 A1 10/2003 Eguchi

FOREIGN PATENT DOCUMENTS

JP 4447108 B2 * 4/2010 ............. C01B 33/06

OTHER PUBLICATIONS

Zeng et al., Li-Filled, B-Substituted Carbon Clathrates, J. Am. Chem. Soc. 2015, 137, 12639-12652 |DOI: 10.1021/jacs.5b07883 (Year: 2015).*
Translation JP 4447108 B2 (Year: 2010).*
Zhu et al., Superconductivity in SrB3C3 clathrate, 2020 (Year: 2020).*
Wang et al., High-temperature superconductivity in SrB3C3 and BaB3C3 predicted from first-principles anisotropic Migdal-Eliashberg theory, Physical Review B 103, 144515(2021) | DOI:10.1103/PhysRevB.103.144515 (Year: 2021).*

(Continued)

*Primary Examiner* — Hoa (Holly) Le
(74) *Attorney, Agent, or Firm* — Stein IP, LLC

(57) ABSTRACT

The present invention provides carbon-based clathrate compounds, including a carbon-based clathrate compound that includes a clathrate lattice with atoms of at least one element selected from the group consisting of carbon and boron as a host cage structure; guest atoms encapsulated within the clathrate lattice; and, substitution atoms that may be substituted for at least one portion of the carbon and boron atoms that constitute the clathrate lattice. In one embodiment, the invention provides a carbon-based clathrate compound of the formula $LaB_3C_3$.

7 Claims, 22 Drawing Sheets
(21 of 22 Drawing Sheet(s) Filed in Color)

(56) References Cited

OTHER PUBLICATIONS

Zhu et al., Carbon-boron clathrates as a new class of sp³-bonded framework materials, Sci. Adv. 2020; 6: eaay8361, Jan. 10, 2020 (Year: 2020).*

Cataldo et al., High-Tc superconductivity in doped boron-carbon clathrates, Physical Review B 105, 064516 (2022) (Year: 2022).*

Chan et al., Hybrid Carbon-Based Clathrates for Energy Storage, J. of Carbon Research, C 2018, 4, 7 | DOI:10.3390/c4010007 www.mdpi.com/journal/carbon (Year: 2018).*

Chen, Superconductivity at 28 K in CaB3C3 predicted from first principles, Research Article | Nov. 5, 2013 (Year: 2013).*

Zhu et al., Superconductivity in SrB3C3 clathrate (Year: 2021).*

Wang et al., High-temperature superconductivity in SrB3C3 and BaB3C3 predicted from first-principles anisotropic Migdal-Eliashberg theory, Physical Review B 103, 144515 (2021) (Year: 2021).*

Cui et al., Prediction of novel boron-carbon based clathrates, Phys. Chem. Chem. Phys., 2022, 24, 16884 (Year: 2022).*

X. Blase et al., "Exceptional Ideal Strength of Carbon Clathrates", 2004, vol. 92, No. 21, Physical Review Letters, pp. 215505-1-215505-4.

Anitti J. Karttunen et al., "Structural Principles of Semiconducting Group 14 Clathrate Frameworks", 2011, Inorg. Chem. 2011, 50, 1733-1742.

Zihe Li et al., "Superhard superstrong carbon clathrate", Carbon 105 (2016), pp. 151-155.

Shoji Yamanaka et al., "An attempt to prepare carbon clathrate compounds using high-pressure and high-temperature conditions", Physica B 383 (2006) 59-62.

Tao Zeng et al., "Li-Filled, B-Substituted Carbon Clathrates", J. Am. Chem. Soc. 2015, 137, 12639-12652.

Strobel et al., A Lanthanum-filled carbon-boron clathrate, https://doi.org/10.1002/ange.202012821 (Year: 2020).

Zeng et al., Li-Filled, B-Substituted Carbon Clathrates, J. Am. Chem. Soc. 2015, 137, 12639-12652 (Year: 2015).

Zhu et al., Prediction of a thermodynamically stable carbon-based clathrate, Published 2017, Materials Science, Physics (Year: 2017).

Babizhetskyy et al., Crystal structure of lanthanum borocarbide, La5B4C5-x (x=0.15), Z. Kristallogr. NCS 218 (2003) 417-418 (Year: 2003).

Babizhetskyy et al., Interaction of Lanthanum with Boron and Carbon: Phase Diagram and Structural Chemistry, Monatsh Chem (2014) 145:869-876 [DOI 10.1007/s00706-014-1172-2] (Year: 2014).

* cited by examiner

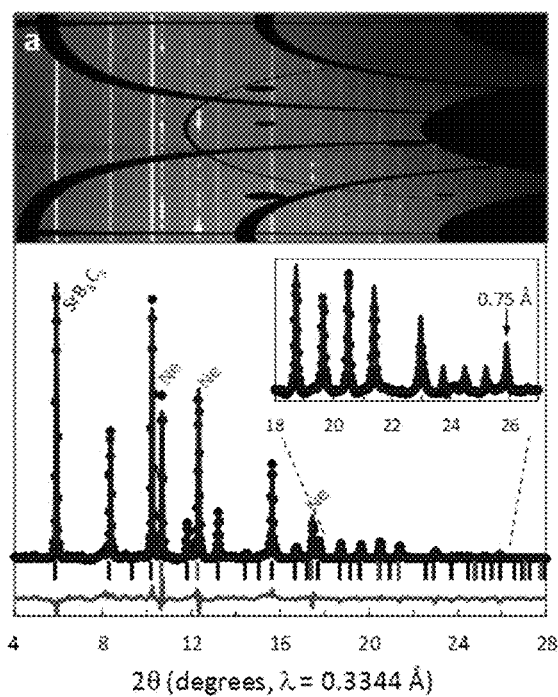 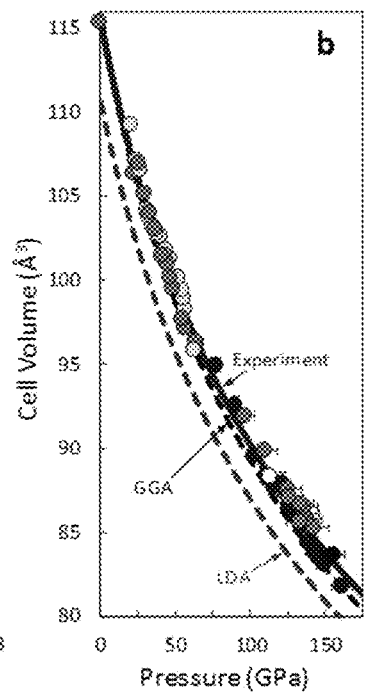
FIG. 3A  FIG. 3B

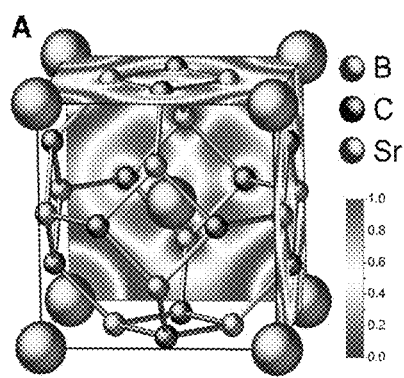 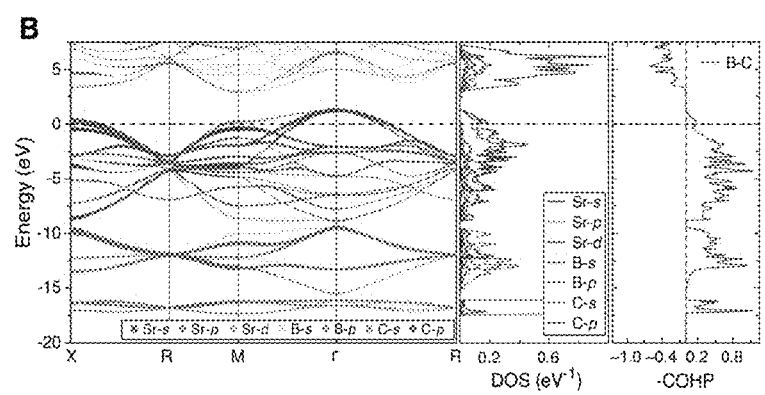
FIG. 4 A                               FIG. 4B

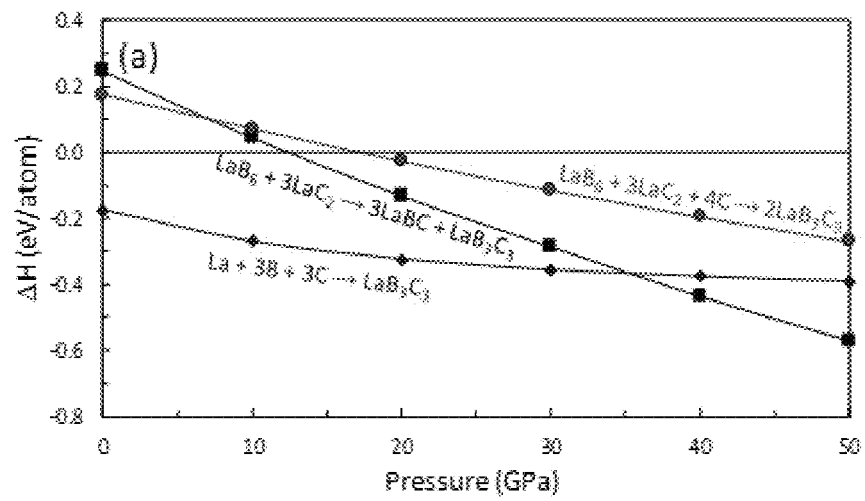
FIG. 9A
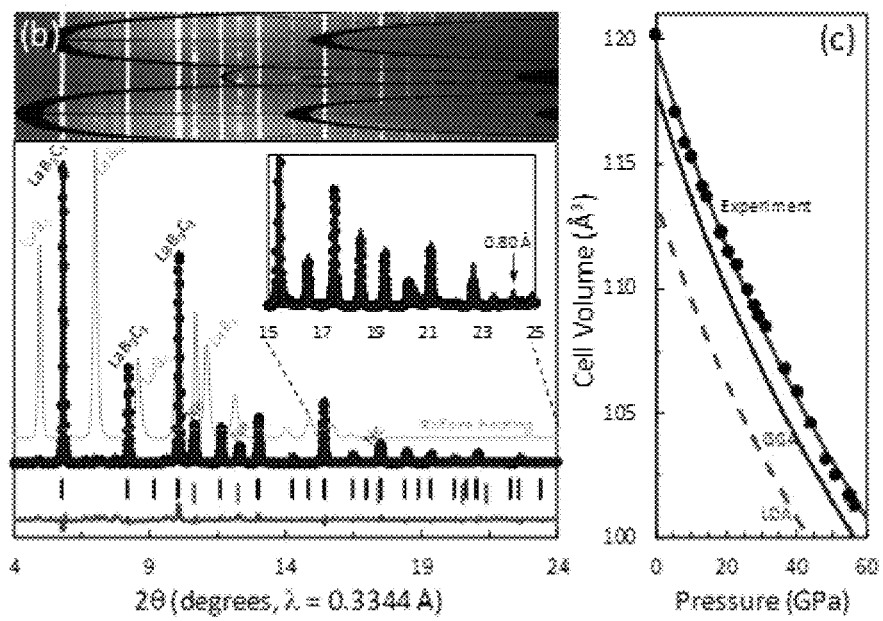
FIG. 9B
FIG. 9C

CARBON-BASED CLATHRATE COMPOUNDS

CROSS-REFERENCE TO RELATED APPLICATIONS

This application is a continuation of U.S. application Ser. No. 16/810,388 filed Mar. 5, 2020, which further claims priority to U.S. Provisional Application No. 62/814,024 filed Mar. 5, 2019, both filed in the United States Patent & Trademark Office, the disclosures of which are incorporated herein by reference in their entireties.

STATEMENT OF INTEREST

This invention was made with Government support under Grant W31P4Q-13-1-0005 awarded by DARPA and Grant DE-SC0001057 from the Department of Energy. The U.S. Government has certain rights in the invention.

FIELD OF THE INVENTION

The present invention relates to carbon-based clathrate compounds such as $SrB_3C_3$ and $LaB_3C_3$ as well as methods of making the same.

BACKGROUND OF THE INVENTION

As a fundamental building block of nature, carbon is unrivalled in its diversity to form stable structures with other elements and itself. One-dimensional (1D) carbon-based materials (e.g., polymers) have thoroughly reshaped society over the past century, in addition to providing the building blocks for life. In recent years, two dimensional (2D) materials, such as graphene, have attracted much attention due to remarkable properties that promise to advance technology. Three dimensional (3D) $sp^3$ carbon-based structures, such as diamond, exhibit many superlative properties including hardness, strength, thermal conductivity and electron mobility. But aside from diamond, only a handful of materials in this class are actually known. Lonsdaleite (hexagonal diamond), B-doped diamond, SiC and $BC_2N$, are valuable high-tech ceramics, but they all maintain the basic structure of diamond. Boron carbide also contains $sp^3$ hybridized carbon atoms, but these atoms serve as links between $B_{12}$ icosahedra, rather than establishing the overall structural framework. From the organic perspective, 3D covalent organic frameworks (COFs), which are formed by linking $sp^2$-hybridized molecular building blocks, have attracted much interest as materials for gas storage and separations. Compared with the exquisite synthetic control over porous COF materials, the experimental progress in denser $sp^3$ carbon-based structures lags far behind.

Numerous 3D carbon allotropes and compounds have been predicted to have feasible energies and interesting properties. However, it remains unclear whether any of these materials can be produced in the laboratory. Aside from the diamond structure, almost no other $sp^3$ carbon-based frameworks are known or can be stabilized at atmospheric pressure. For example, longstanding predictions of 3D $sp^3$-bonded $C_3N_4$ networks have not been realized thus far, and high-pressure polymeric phases of $CO_2$, which consist of a network of $CO_4$ tetrahedra, decompose into molecular $CO_2$ phases when decompressed.

There is thus a need to predict and synthesize new 3D $sp^3$ carbon-based structures that have useful properties. Accordingly, the principal object of the invention is to provide carbon-based structures, principally in the form of a carbon-based clathrate compound. Other objects will also be apparent from the detailed description of the invention.

SUMMARY OF THE INVENTION

Broadly stated, the objects of the invention are realized, accordingly to one aspect of the invention, through the prediction and synthesis of carbon-based clathrate compounds that include a clathrate lattice, guest atoms, and, optionally, substitution atoms for the atoms that form the clathrate lattice. More specifically, the carbon-based clathrate compounds may include (i) a clathrate lattice with atoms of at least one element selected from the group consisting of carbon and boron as a host cage structure; (ii) guest atoms encapsulated within the clathrate lattice; and (iii) substitution atoms that may be substituted for at least one portion of the carbon and boron atoms that constitute the lattice.

According to one aspect of the invention, the guest atoms are lanthanum (La). In another aspect of the invention, the guest atoms may also include Ba, Ca, Sr, or other atoms with a similar ionic radius.

According to one aspect of the invention, the substitution atoms comprise nitrogen. In another aspect of the invention, the nitrogen atoms are substituted for at least some boron atoms.

According to one aspect of the invention, the structure of the carbon-based clathrate compound is cubic bipartite sodalite.

According to one aspect of the invention, the clathrate lattice includes cages, each cage including 24 atoms with six four-sided faces and eight six-sided faces.

According to another aspect, the invention is a compound of the formula $LaB_3C_3$.

According to another aspect of the invention, the $LaB_3C_3$ compound is a carbon-based clathrate. In another embodiment, the structure of the carbon-based clathrate is cubic bipartite sodalite. In another embodiment of the invention, the compound comprises a clathrate lattice with atoms selected from the group consisting of carbon and boron as a host cage structure. In another embodiment of the invention, the clathrate lattice is formed of $sp^3$ hybridized carbon and boron.

According to one aspect of the invention, the Lanthanum is a guest atom encapsulated within the clathrate lattice. According to another aspect of the invention, the clathrate lattice comprises cases, each cage comprising 24 atoms with six four-sided faces and eight six-sided faces.

Advantageously, the compound of the formula $LaB_3C_3$ may have semiconductor properties. Additionally, other carbon-based clathrate compounds such as $SrB_3C_3$ may be superconductors.

According to one aspect of the invention, the compound of the formula $LaB_3C_3$ has a bulk modulus of 255 GPa. In another embodiment of the invention, the compound of the formula $LaB_3C_3$ has a has a calculated hardness of about 30 GPa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is more fully described by reference to the following detailed description and the accompanying drawings wherein:

FIG. 3A provides experimental x-ray diffraction data collected at 57(3) GPa with Rietveld refinement of the $SrB_3C_3$ phase. More specifically, the experimental X-ray diffraction data (black points) was collected at 57(3) GPa with Rietveld refinement (blue line) of the $SrB_3C_3$ phase. Green ticks indicate contributions from Ne with Le Bail refinement. The 2D diffraction cake image aligned with the integrated pattern shows nearly complete powder averaging with sharp peaks for the $SrB_3C_3$ phase. The inset shows a magnified view at high angle with sharp $SrB_3C_3$ peaks to a limiting resolution of 0.75 Å.

FIG. 3B provides experimental EoS and calculated EoS data for the $SrB_3C_3$ phase. Experimental EoS (solid blue line) with B0=249(3) GPa, B0'=4.0 (fixed) and calculated EoS (dashed lines) with B0 (DFT-LDA)=257 GPa, B0'=4.0 (fixed); B0 (DFT-GGA)=225 GPa, B0'=4.0 (fixed). Different colored symbols represent data points from six independent experimental runs.

FIG. 4A provides electronic properties of $SrB_3C_3$ and in particular a two-dimensional electron localized function (ELF) for the compound.

FIG. 4B provides electronic band structures for $SrB_3C_3$ at 0 GPa projected onto atomic orbitals, where the width of each band is proportional to the weight of the corresponding orbital character. The projected density of states and Crystal Orbital Hamilton Population (COHP) between adjacent B and C atoms in $SrB_3C_3$ at 0 GPa are shown to the right. The Fermi energy is set to 0 eV (dashed line).

FIG. 7A and FIG. 7B show calculated tensile stress-strain relations for $SrB_3C_3$ with GGA (FIG. 7A) and LDA (FIG. 7B). FIG. 7C and FIG. 7D show calculated shear stress-strain relations for $SrB_3C_3$ in the (110) easy cleavage plane with GGA (FIG. 7C) and LDA (FIG. 7D).

FIG. 9A shows computed stability of $LaB_3C_3$ via different reaction pathways indicating exothermic formation from pure elements and from stable binaries above ca. 20 GPa.

FIG. 9B shows Rietveld refinement of $LaB_3C_3$ at 57(2) GPa with a=4.66307(8) Å, wRp-Bknd=0.042, $\chi^2$=3.8. The sample is nearly phase pure with a trace impurity of unreacted $LaB_6$. Inset shows well-resolved peaks to a limiting resolution of 0.80 Å. The 2D cake image, presented above the integrated pattern, indicates uniform powder averaging. The pattern obtained before heating (grey trace) shows only cubic $LaB_6$ and Ne; ballmilled $LaC_2$ and glassy carbon appear amorphous.

FIG. 9C provides unit cell volume of $LaB_3C_3$ as a function of pressure. Experimental data were fitted using a third-order Birch-Murnaghan EoS with $B_0$=254(9) GPa and $B_0'$=3.6(4). DFT results yield $B_0$=248 GPa with $B_0'$=3.8 (PBEGVW and $B_0$=268 GPa with $B_0'$=3.9 (LDA).

DETAILED DESCRIPTION OF THE INVENTION

Figure 1A:
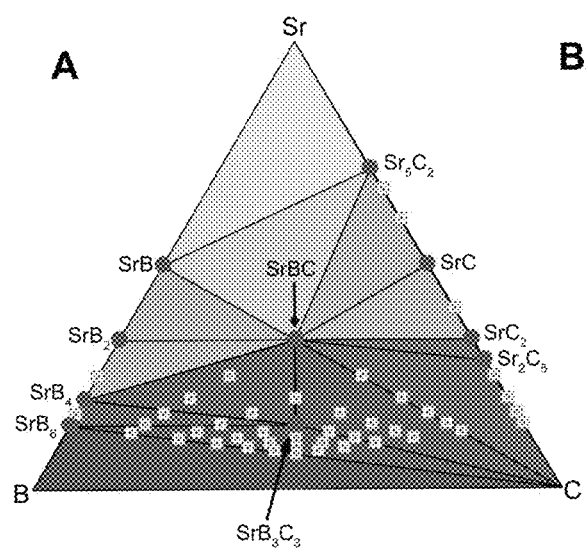
FIG. 1A is a ternary phase diagram of a Sr—B—C system at 50 GPa. Circles (green) represent thermodynamically stable compounds while squares (orange) represent additional metastable compositions used in the search.

Carbon clathrate is an impressive 3D sp$^3$ material. Carbon-based clathrates are open-framework structures composed of host cages that trap guest atoms in which all host atoms are linked by four-coordinate bonds. As sp$^3$-bonded frameworks, carbon-based clathrates represent strong and lightweight materials that also offer tunable properties through manipulation of the occupancy and type of guest atoms within the cages. Despite their prominence in other systems with tetrahedral coordination, carbon-based clathrates have not yet been reported due to tremendous challenges associated with their synthesis.

Attempts to synthesize carbon clathrates go back at least 50 years since they were postulated following the formation of inorganic silicon clathrates, and their possible structures and properties are of longstanding interest. However, carbon clathrates have not been successively synthesized yet. Some proposed but unrealized carbon clathrates are expected to exhibit exceptional mechanical properties with tensile and shear strengths exceeding diamond, while large electron-phonon coupling is predicted to give rise to conventional superconductivity with high transition temperatures. If produced, these materials may represent a class of diamond-like compounds wherein the electronic structure is tunable by adjusting the occupancy of electron-donating (or withdrawing) atoms within the cages.

The inventors have performed a substantial amount of research to answer the persisting question of whether carbon clathrate structures are accessible by experiment. First-principles DFT calculations indicate that both filled and guest-free carbon clathrates are energetically unfavorable but by energies as low as 0.07 eV/atom relative to diamond (for reference, commercially produced $C_{60}$ is metastable by nearly six times that energy). Synthesis of carbon clathrates might therefore proceed through a non-equilibrium pathway (e.g., formation from a high-energy precursor or deposition method) or through a chemical substitution/doping strategy to modify the intrinsic thermodynamic stability. No successful metastable pathways to carbon clathrates have been established yet, although three-dimensional polymers of $C_{60}$ have been suggested to resemble carbon clathrate-like structures.

While non-equilibrium synthesis pathways remain feasible in concept, another strategy is to substitute boron for carbon atoms within the cage frameworks of carbon clathrates. The electron deficient nature of boron creates the ability to form complex chemical bonding with itself or carbon to stabilize polyhedra, such as the icosahedral units in molecular carborane clusters. Zeng et al. calculated that boron substitution can improve the intrinsic thermodynamic stability of carbon clathrate frameworks. Nevertheless, no thermodynamically stable carbon-clathrate was predicted after examination of a small subset of possible B substitution schemes in Li-filled carbon clathrates. A broad search of potential B substitution schemes was therefore needed to validate this chemical stabilization principle. Here, the inventors established the first thermodynamically stable carbon-based clathrate using automatic structure searching methods and validated the prediction via high-pressure and high-temperature experiments, thus expanding known sp$^3$ carbon materials to a new class with tunable properties.

The inventors conducted an extensive computational search in the Sr—B—C system (including pure elements, binaries and ternaries from $SrB_xC_y$ with 0≤x, y≤6) at pressures from 0-200 GPa after broader searching in ternary B—C systems with a variety of metals including Li, Na, Mg and Ca. For the Sr—B—C system, several high-pressure compounds were determined to be thermodynamically stable with respect to elemental mixtures (see FIG. 1A and FIG. 1B). At 50 GPa, the hexagonal P6$_3$/mmc and γ-B structures were calculated to be the most stable forms of Sr and B, respectively, while diamond is the most stable structure for C. The compounds $Sr_5C_2$, SrC, $SrC_2$, $Sr_5C_2$, SrB, $SrB_2$, $SrB_4$, and $SrB_6$ were found to be the stable binaries on the convex hull at 50 GPa (discussed below in more detail). The inventors found no energetically stable B—C binary compounds above 50 GPa, in agreement with a previous computational study.

Two stable ternary compounds were predicted at 50 GPa. The first, hexagonal SrBC (space group P$\bar{m}$3/mmc), exhibits two-dimensional layers of six-membered B—C rings stacked between layers of Sr atoms, similar to intercalated graphite. This new SrBC phase is isostructural with LiBC found at ambient pressure. The second ternary compound is cubic (space group Pm$\bar{3}$n)) with composition 2Sr@$B_6C_6$ ($SrB_3C_3$) and has the type-VII clathrate structure, known for the clathrate hydrate $HPF_6 \cdot 6H_2O$ and related to inorganic compounds such as $BaPd_2P_4$ through a small structural distortion. The topology of $SrB_3C_3$ is that of bipartite sodalite (sod-b), which is distinguished from the sodalite structure (sod) in that carbon atoms are only bonded to boron atoms and vice versa. This is the first prediction of a thermodynamically stable carbon-based clathrate.

Figure 2:
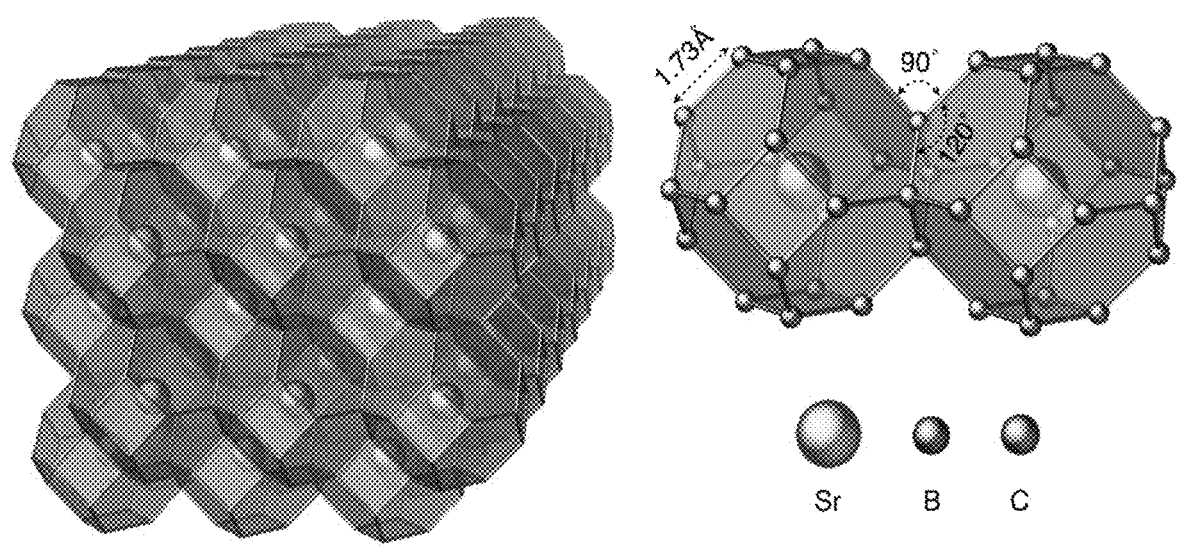
FIG. 2 provides the structure of an $SrB_3C_3$ clathrate. The structure also may represent the $LaB_3C_3$ Clathrate, with La as the guest atom. The cubic structure is composed of face-sharing boron-carbon cages that encapsulate Sr or La atoms. Each cage contains 24 atoms with six four-sided faces and eight six-sided faces ($4^6 6^8$). Different color cages are used to emphasize the stacking of cages that tile 3D space.

The $SrB_3C_3$ clathrate framework (FIG. 2) is composed of a single truncated octahedral cage with six four-sided faces and eight six-sided faces ($4^6 6^8$). The cages are comprised of 24 vertices with alternating C and B atoms and each cage contains a single Sr atom at the center. This type-VII clathrate phase is predicted to be thermodynamically stable from 50 to at least 200 GPa. The material does not exhibit imaginary phonon frequencies at any pressure indicating dynamic stability and favorable conditions for metastable recovery to ambient conditions. At zero pressure, the optimized lattice parameter is 4.88 Å, and the structure contains one unique B—C bond length of 1.73 Å. The boron-doped clathrate is much more stable than its pure carbon counterpart: at 50 GPa, 2Sr@$C_{12}$ is metastable by 0.667 eV/atom, while 2Sr@$B_6C_6$ lies on the convex hull.

DFT calculations show that at 50 GPa $SrB_3C_3$ is a stable product of exothermic reactions of the pure elements and of readily accessible binary compounds. Therefore, the inventors conducted diamond-anvil cell (DAC) experiments using homogeneous fine-grained mixtures of $SrB_6$, $SrC_2$ and glassy C targeting the stoichiometric reaction $SrB_6+SrC_2+4C\rightarrow 2SrB_3C_3$. Additional experiments were conducted using only mixtures of binary compounds where the most energetically favorable reaction was calculated as $SrB_6+3SrC_2\rightarrow SrB_3C_3+3SrBC$. Mixtures of the powders were compressed in Ne or $Al_2O_3$ media and heated near ~2500 K using an infrared fiber laser while synchrotron X-ray diffraction patterns were collected to monitor structural changes in situ.

The starting $SrB_6$ possesses the $LaB_6$ (Pm$\bar{3}$m) structure, whereas $SrC_2$ takes on the acetylide structure of $CaC_2$ (I4/mmm). When compressed at room temperature, $SrB_6$ remains in the starting cubic phase and $SrC_2$ transforms to the R$\bar{3}$m structure ($BaC_2$ type) above 14 GPa, eventually appearing amorphous to X-rays above 50 GPa. Upon heating near 2500 K, the intensities of diffraction peaks from the starting compounds vanish and a series of new reflections appear. At 57(3) GPa, these sharp lines were initially indexed to a phase-pure BCC cubic lattice with a=4.5972(2)

A, in excellent correspondence with the type-VII $SrB_3C_3$ clathrate (Pm$\bar{3}$n) with a calculated lattice parameter of a=4.593 Å at the same pressure.

The calculated X-ray diffraction pattern of the $SrB_3C_3$ clathrate is compared with experimental scattering data in FIG. 3A and FIG. 3B. Given the nearly complete experimental powder averaging statistics, the quantitative diffraction intensities are representative of atomic positions and are in excellent agreement with the calculated pattern of $SrB_3C_3$ clathrate to the experimental resolution limit of 0.75 Å. All allowed reflections with calculated intensity are observed to this limit, consistent with the formation of $SrB_3C_3$ clathrate.

Given the large contrast in electron density between Sr and the framework atoms, the heavier element dominates the intensity of scattered X-rays. While the formation of $SrB_3C_3$ is strongly supported by the stoichiometric conversion of the starting materials, the intensities of the allowed reflections that differentiate the primitive bipartite structure from the BCC sodalite version are in fact negligible, and the possibility for another type of cubic Sr lattice must be considered. The inventors exclude a new elemental Sr lattice that could potentially describe these data based on the requirement of large Sr—Sr distances near 3.8 Å, which are >1.1 Å larger than the distances between Sr atoms in the known metallic phases at this pressure. Other Sr compounds with cubic sublattices are excluded by the experimental P—V EoS, which uniquely distinguishes clathrate cage structures based on agreement with DFT calculations over a broad pressure range from 0-150 GPa. $SrB_3C_3$ and other higher-energy cage variants are much less compressible than all other stable and metastable elemental structures and binary/ternary compounds calculated except pure boron allotropes and diamond.

The $SrB_3C_3$ framework exhibits strong covalent bonding between $sp^3$-hybridized B and C atoms, and weak interactions with the Sr guest. This strong $sp^3$-hybridized covalent framework guarantees a high value for the bulk modulus ($B_0$=249(3) GPa) and incompressibility of $SrB_3C_3$ clathrate. Based on electron count, $SrB_3C_3$ should be a hole conductor, and calculations show it is. The reasoning is as follows: All all-carbon, four-coordinate zeolites are insulators at low pressures, closed-shell systems analogous to diamond. A sodalite all-carbon clathrate would be that, and so would isoelectronic $[C_3B_3]^{3-}$. $SrB_3C_3$ is one electron per formula unit short of this magic (insulator) electron count. Indeed, the band structure (FIG. 4B) shows this—a good gap for one electron more than $SrB_3C_3$. See also FIG. 4A.

$SrB_3C_3$ clathrate is likely the first member of a new class of strong and lightweight $sp^3$-bonded carbon-based frameworks with tunable properties. Because boron anions are isoelectronic to carbon atoms in the B—C framework, the bipartite structure should exhibit similar properties to hypothetical pure carbon cages. Furthermore, the ability to trap various kinds of guest atoms in the $sp^3$-bonded cages allows the carbon-based clathrates to possess diamond-like mechanical properties with a tunable electronic structure. While $SrB_3C_3$ is metallic, the electronic structure may be modified by substituting different guest atoms. For example, $LaB_3C_3$, which the inventors also predict to be thermodynamically stable at high pressure, possesses a band gap due to the balanced electron count. The removal of guest atoms from the cages offers an additional space to explore with the possibility for guest-free structures. Although $SrB_3C_3$ is only thermodynamically stable at high pressure, the inventors find that it is recoverable to atmospheric pressure, similar to diamond, which is produced on an industrial scale. At 1 atm, $SrB_3C_3$ persists when kept under an inert atmosphere, but it begins to degrade when exposed to the moisture in air over prolonged time (hours). The extent to which alternative clathrate structure types are achievable through different boron substitution/guest schemes are being investigated, and the formation pressure and stability may be optimized. The results may also shed light on the role of element substitution in stabilizing entirely different framework structures. It is likely that the framework stabilization principle observed here with boron is applicable to other elements, including more electronegative ones like nitrogen. There are prospects to obtain a much richer landscape for new carbon-based materials with advanced properties by applying this stabilization principle.

Figure 5:
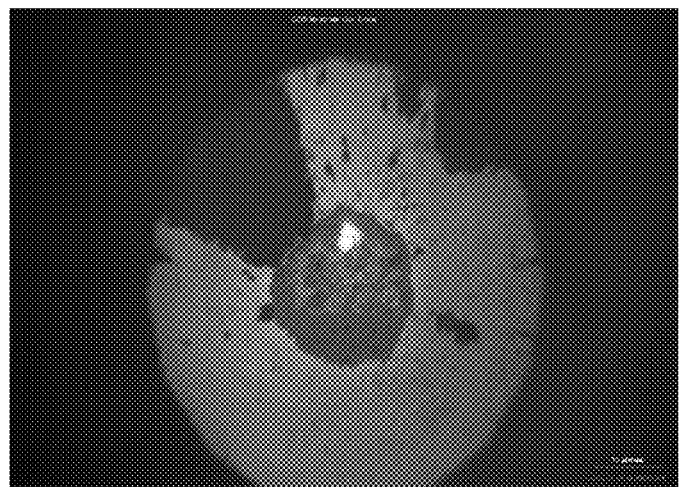
FIG. 5 provides an image showing in situ synthesis of $SrB_3C_3$ with laser heating in a diamond anvil cell.

FIG. 5 provides an image showing in situ synthesis of $SrB_3C_3$ with laser heating in a diamond anvil cell. The central hole contains the sample with a laser hot spot that is rastered over the samples. The reflective box is sample converted to $SrB_3C_3$; the bottom portion is unconverted.

Figure 6A:
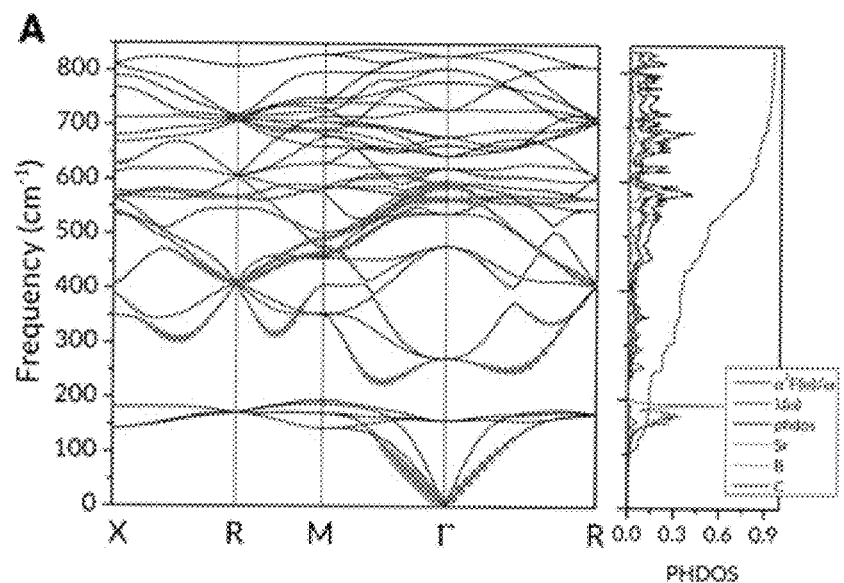
FIG. 6A shows phonon dispersion, phonon density of states and electron-phonon integral of $SrB_3C_3$ at 0 GPa.
Figure 6B:
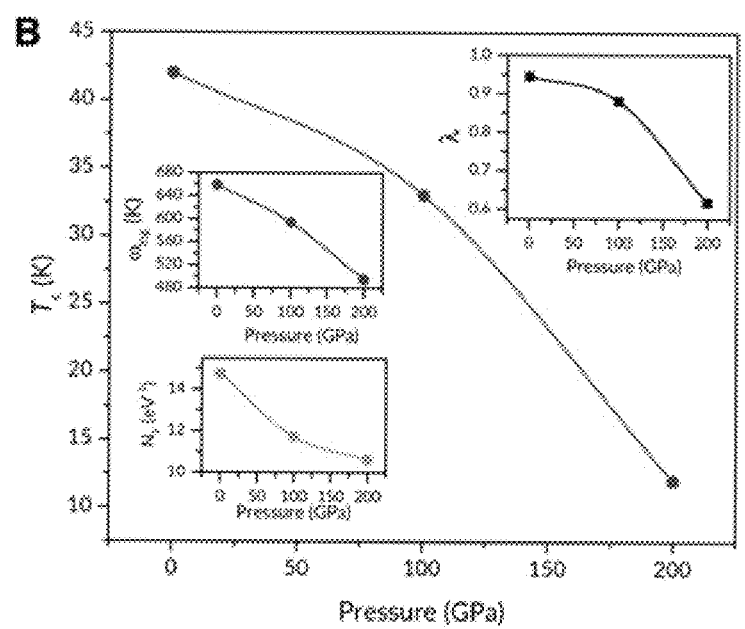
FIG. 6B shows Tc as a function of pressure for $SrB_3C_3$.

FIG. 6A and FIG. 6B demonstrate the superconducting transition temperature of $SrB_3C_3$. FIG. 6A shows phonon dispersion, and phonon density of states (PHDOS) and electron-phonon integral $\lambda(\omega)$ of $SrB_3C_3$ at 0 GPa. FIG. 6B shows $T_c$ as a function of pressure. The insets show the evolution of $\lambda$ and $\omega_{log}$ with pressure. The superconducting transition temperature, $T_c$, was estimated from the Allen-Dynes modified McMillan equation, and a typical value of the Coulomb pseudopotential $\mu$*=0.1 was used. The calculated $T_c$ is 42 K at ambient pressure.

Figure 7A:
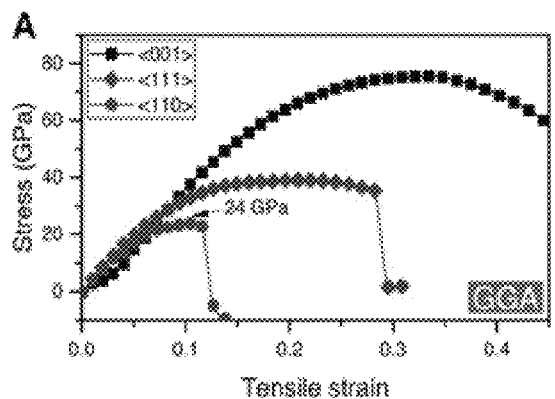
FIGS. 7A-7D show calculated stress-strain relations of $SrB_3C_3$.
Figure 7B:
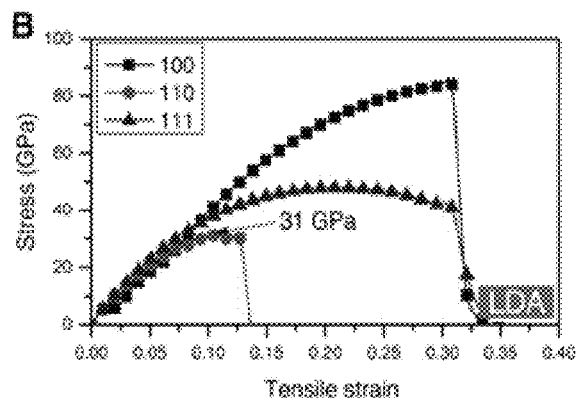
Figure 7C:
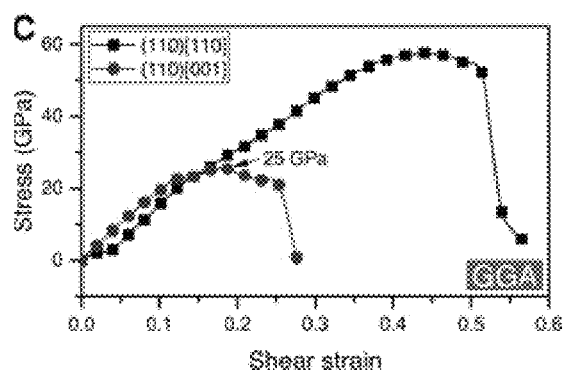
Figure 7D:
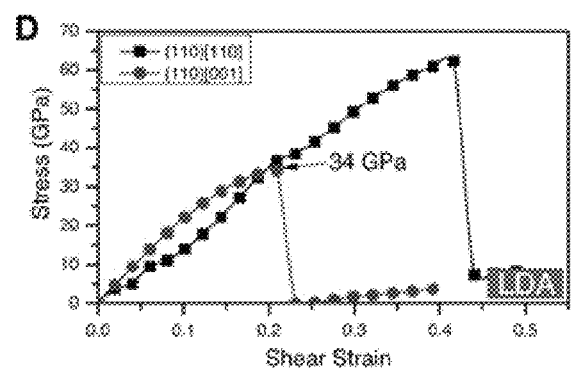

FIGS. 7A-7D show calculated stress-strain relations of $SrB_3C_3$. More specifically, FIG. 7A and FIG. 7B show calculated tensile stress-strain relations for $SrB_3C_3$ with GGA (FIG. 7A) and LDA (FIG. 7B). FIG. 7C and FIG. 7D show calculated shear stress-strain relations for $SrB_3C_3$ in the (110) easy cleavage plane with GGA (C) and LDA (D). The stress response along different deformation paths under tensile and shear strains, combined with the lowest peak stress defines the corresponding ideal strength, which is the maximum stress that a perfect crystal can sustain before yielding to a plastic deformation. The established method was applied to determine the stress-strain relations for $SrB_3C_3$ under tensile strains in three principal crystallographic directions. The lowest value of calculated peak stress is 24 GPa (31 GPa with LDA) along the <110> direction, which indicate that the <110> direction is the weakest tensile direction, and thus the (110) planes are the easy cleavage planes. The inventors next evaluate the shear stress response in the (110) "easy cleavage plane" of $SrB_3C_3$. The lowest peak shear stress of 25 GPa (34 GPa with LDA) in the (110)[$\bar{1}$10] shear direction. These strength values place $SrB_3C_3$ as a very hard material with a hardness between 24-34 GPa.

According to one aspect of the invention, the inventors have predicted and synthesized the carbon-based clathrate structure with La as the guest atom. The clathrate compound $LaB_3C_3$ is different in many respects from other carbon clathrate compounds discussed above.

The inventors report a carbon-based clathrate with composition 2La@$B_6C_6$ ($LaB_3C_3$). Like $SrB_3C_3$, the La version crystallizes in the cubic bipartite sodalite structure (type VII clathrate) with La atoms encapsulated within truncated octahedral cages comprised of alternating carbon and boron atoms. The covalent nature of B—C bonding results in a rigid, incompressible framework, and due to the balanced electron count, $La^{3+}[B_3C_3]^{3-}$ is a semiconductor with an indirect band gap estimated near 1.29 eV. Given that different guest atoms can be substituted within the clathrate cages, it is possible that a broad range of boron-stabilized carbon clathrates with varying properties may be synthesized with ranging physical properties.

To probe the possibility of forming the bipartite sodalite-type carbon-boron clathrate with a trivalent guest, the inventors first performed first-principles structure searching computations using the CALYPSO method. Like the case of $SrB_3C_3$, the inventors predicted that $LaB_3C_3$ becomes stable under high-pressure conditions. After conducting a computational survey of binary and ternary compounds in the La—B—C system, the inventors estimate that $LaB_3C_3$ is the exothermic product of stable binary compounds and/or single components above about 20 GPa (FIG. 9A). Compared with calculations for $SrB_3C_3$, the pressure required for $LaB_3C_3$ is reduced by about 20 GPa—a much more favorable synthetic condition that we tentatively attribute to the overall balanced electron count.

According to one aspect of the invention, $LaB_3C_3$ was synthesized according to the reaction $LaB_6+LaC_2+4C \rightarrow 2LaB_3C_3$ at high pressure using diamond anvil cells. After heating near 2500 K with an infrared fiber laser, the starting precursor was converted into an essentially phase-pure cubic phase (FIG. 9A), as expected for the clathrate (space group $Pm\bar{3}n$). At 57(2) GPa, the experimental lattice parameter a=4.66 Å is in good agreement with a DFT optimized $LaB_3C_3$ structure with a=4.63 Å at 60 GPa (PBEGVW), and Rietveld refinement of the powder data show excellent agreement with the predicted clathrate structure (FIG. 9B). In addition, the stoichiometric conversion from the homogeneous precursor to a single phase strongly supports the 1 La:3B:3C composition, and a uniform single-phase region near this composition was also confirmed using energy-dispersive X-ray spectroscopy (EDX) mapping on the recovered product. Experimentally, the inventors confirmed the formation of $LaB_3C_3$ at 38 GPa but did not observe conversion at 35 GPa, placing a tentative bound on the minimum required synthesis pressure. Compared with $SrB_3C_3$ synthesized near 50 GPa, this represents a significant pressure reduction and suggests promise for future stabilization efforts at even milder conditions.

Synchrotron X-ray diffraction patterns collected during decompression confirm the clathrate framework of $LaB_3C_3$ based on compressibility. The decompression data were fitted using a third-order Birch-Murnaghan equation of state (EoS) with the zero-pressure bulk modulus $B_0$=254(9) GPa and it's derivative $B_0'$=3.6(4). The bulk modulus compares favorably with calculations based on DFT (FIG. 11), noting that LDA significantly underestimates the volume for a given pressure. $LaB_3C_3$ is very incompressible with $B_0$ in the range of technical ceramics used for armor, such as $B_4C(B_0$=243(3) GPa), and the observed bulk modulus cannot be explained by any structures other than the clathrate. Similar to $SrB_3C_3$, the La counterpart is recoverable to ambient conditions, but must be preserved carefully under an inert atmosphere. When samples are exposed to air/moisture, they degrade into what is presumed to be hydrolysis products. Several attempts to prepare samples for transmission electron microscopy by focused ion beam milling were unsuccessful and resulted in oxidized amorphous material.

Figure 20:
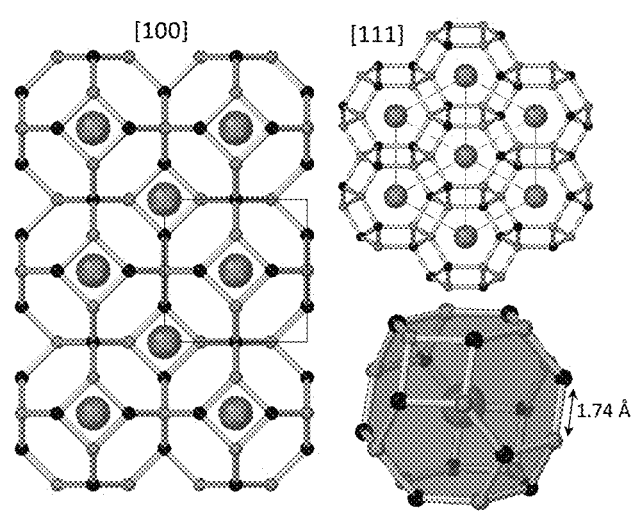
FIG. 20 provides the structure of $LaB_3C_3$ viewed along different crystallographic directions. C and B atoms make up the framework, while La is trapped in the cages. The single $4^6 6^8$ cage has one unique B—C distance of 1.74 Å at atmospheric pressure.

Like $SrB_3C_3$, $LaB_3C_3$ is predicted to crystallize in the cubic bipartite sodalite structure (FIG. 20). This structure type is known for the clathrate hydrate $HPF_6 \cdot 6H_2O$ and is related to inorganic compounds such as $BaPd_2P_4$ through a small structural distortion, as well as superhydrides such as $CaYH_6$ and $CaYH_{12}$. The clathrate structure is comprised of a single truncated octahedral $B_{12}C_{12}$ cage with six four-sided faces and eight six-sided faces ($4^6 6^8$). All faces are shared between cages so that the single cage type can fully tile three-dimensional space without any voids. All atoms are on special crystallographic positions so that there is only one unique C—B distance and one unique C(B)—Sr distance. The square and hexagonal faces result in a mixture of 90° and 120° C.—B—C bond angles. The incorporation of B within the framework reduces the energetic penalty for the 90° bond angles.

Given the strong contrast in electron density between framework and guest atoms, powder diffraction can neither distinguish the positions and occupancies of boron and carbon (i.e., the "coloring" of the clathrate lattice) nor the weak intensity reflections that differentiate the primitive (bipartitie) and body-centered cubic (sodalite) lattices. The inventors therefore conducted single-crystal diffraction on suitable grains produced by laser heating at high temperatures above 3000 K. Similar to the case of $SrB_3C_3$, the observation of {120} reflections with significant intensity confirms the primitive space group $Pm\bar{3}n$, and the ordered bipartite structural model produces the lowest reliability factor between experimental observations compared with other possible coloring schemes.

Figure 21A:
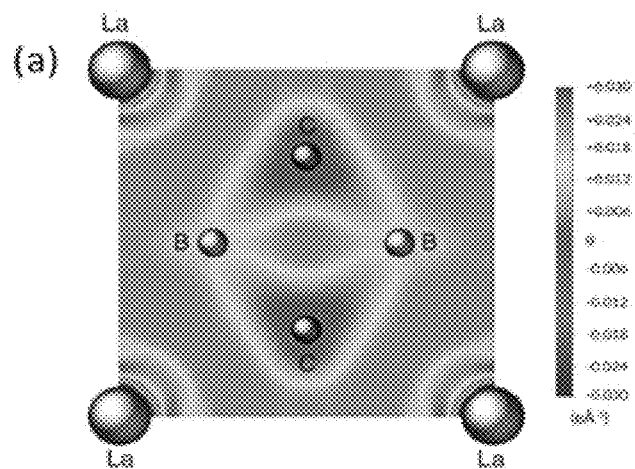
FIG. 21A shows the difference in charge density for $LaB_3C_3$ (crystal density minus isolated atomic density) viewed in the (100) plane at 0 GPa.
Figure 21B:
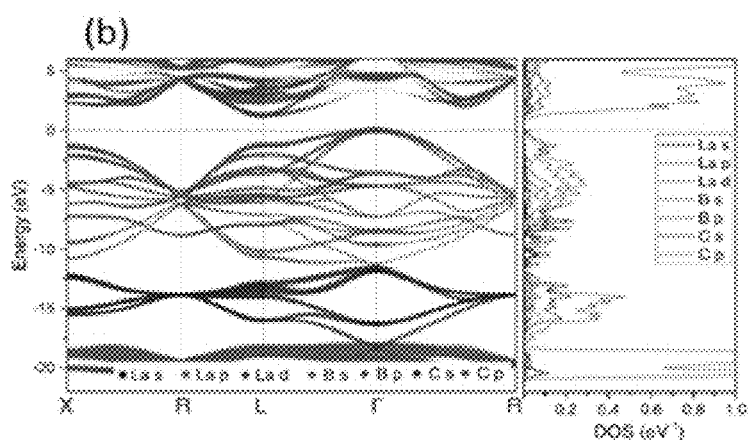
FIG. 21B shows the electronic band structure (HSE) of $LaB_3C_3$ at 0 GPa with density of states. Contributions from different orbitals are indicated.

At 0 GPa, the $LaB_3C_3$ lattice is slightly expanded compared with that of $SrB_3C_3$(a=4.934 Å vs. 4.868 Å). This is somewhat surprising as the ionic radius of $La^{3+}$ is expected to be smaller than that of $Sr^{2+}$(1.36 Å vs. 1.44 Å for 12-fold coordination), see http://abulafia.mt.ic.ac.uk/shannon/radius.php. The increased cell size and thus B—C bond length in $LaB_3C_3$(1.74 Å vs 1.72 Å $SrB_3C_3$) can be understood as additional charge transferred from guest to host. Indeed, charge density analysis (FIG. 21A and FIG. 21B) show that 1.82 $e^-$ are transferred from La to the B/C host lattice, whereas 1.35 $e^-$ are transferred for the case of Sr.

The electronic band structure of $LaB_3C_3$ also reveals the influence of the additional electron. Unlike $SrB_3C_3$, which is one electron short of a band gap, $LaB_3C_3$ shows an indirect gap of 1.29 eV in the Γ→L direction. The top of the valence band is composed primarily of hybrid p states of B and C, while the conduction band is constituted primarily of d states from La. $LaB_3C_3$ is comparable to B-substituted silicon frameworks such as $K_7B_7Si_{39}$ and $LiBSi_2$ with electron precise frameworks in which the metals act as electron donors, as in Zintl phases.

Summarizing the above, a second carbon-boron clathrate in the bipartite sodalite structure was prepared with La guest atoms. Unlike metallic $SrB_3C_3$, $LaB_3C_3$ has a balanced electron count and is predicted to be a semiconductor. This balanced count is also likely responsible for the improved synthetic conditions, i.e., >20% reduction in synthetic pressure. The observation of two clathrate structures indicates that many other type-VII clathrates may be possible with different guest atoms. The inventors suggest that entirely different clathrate structure types also may be possible with different carbon:boron ratios and cage types. Carbon-based clathrates thus represent a class of new materials with highly tunable properties.

Figure 8:
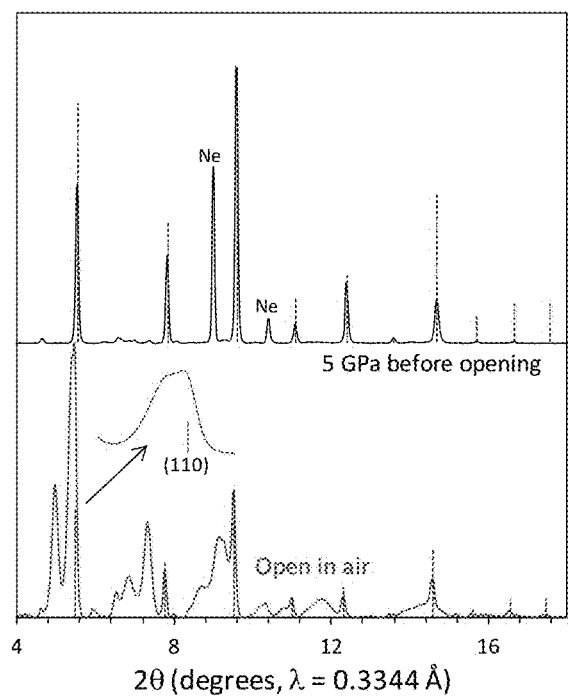
FIG. 8 provides an XRD pattern showing $LaB_3C_3$ recovered to low pressure. The Powder XRD pattern of $LaB_3C_3$ is shown during decompression at 5 GPa (top), and after opening the cell in air (bottom). Bragg positions from cubic $LaB_3C_3$ are marked by blue lines. The diffraction intensity was limited by the opening angle above $2\theta=14°$. When exposed to air, $LaB_3C_3$ degrades into unknown, presumably, hydrolysis products. Diffraction from unreacted $LaB_3C_3$ can still be observed in air several minutes after the cell was opened.

FIG. 8 provides a powder XRD pattern of $LaB_3C_3$ during decompression at 5 GPa (top), and after opening the cell in air (bottom). Bragg positions from cubic $LaB_3C_3$ are marked by blue lines. The diffraction intensity was limited by the opening angle above 2 q=14°. When exposed to air, $LaB_3C_3$ degrades into unknown, presumably, hydrolysis products. Diffraction from unreacted $LaB_3C_3$ can still be observed in air several minutes after the cell was opened.

Figure 10:
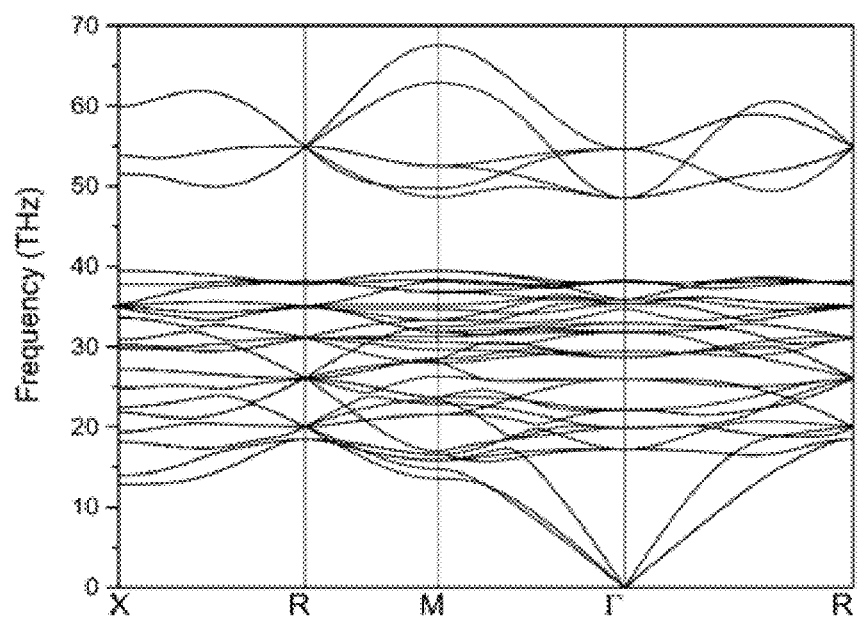
FIG. 10 shows phonon dispersion for $LaB_3C_3$ at 1 atm showing dynamic stability.

FIG. 10 provides phonon dispersion for $LaB_3C_3$ at 1 atmosphere, showing dynamic stability.

Figure 11:
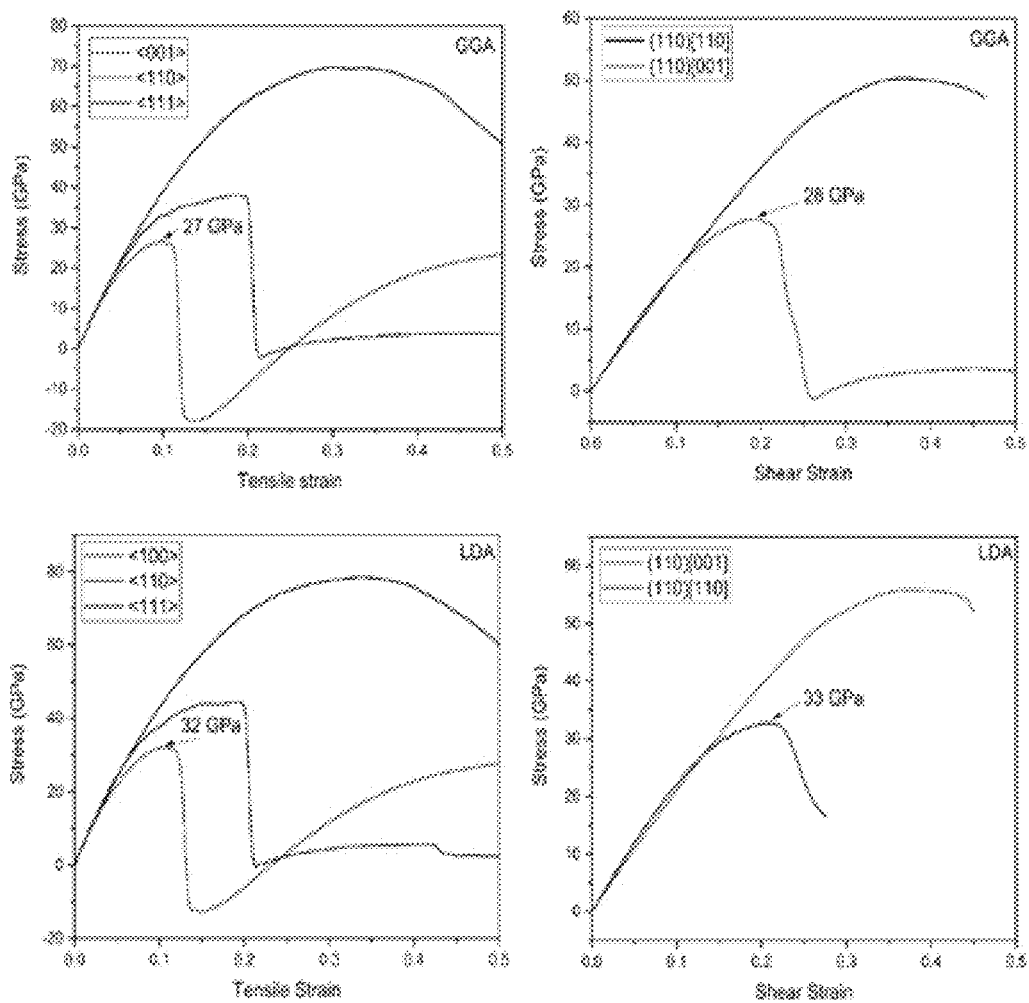
FIG. 11 provides stress-strain calculations for $LaB_3C_3$ with GGA and LDA, indicating a high ideal strength with hardness near 30 GPa.

FIG. 11 provides stress-strain calculations for $LaB_3C_3$ with GGA and LDA. The calculations indicate a high ideal strength with hardness in near 30 GPa.

According to one aspect of the invention, the starting precursors to form the carbon clathrate compounds are borides, carbides and pure carbon.

Both the La and the Sr-based carbon clathrates are recoverable to ambient conditions but must be preserved under an inert atmosphere (e.g., argon) due to degradation in air.

$SrB_3C_3$ is predicted to be a hole metal with a high superconducting transition temperature near 42 K. $LaB_3C_3$ is predicted to be a semiconductor. The clathrate structures exhibit a high bulk modulus near 25 GPa and are predicted to exhibit high strength and hardness.

According to one aspect embodiment of the invention, the carbon-based clathrate structures are composed of entirely $sp^3$ hybridized carbon and boron, which results in diamond-like bonding. In an embodiment of the invention, different guest atoms may be substituted within the cages to create a new class of diamond-like materials with tunable properties. Many other guest atoms are calculated to be possible within the clathrate cages.

Different boron substitution schemes may result in entirely different clathrate structures. Other elemental substitution schemes for the host lattice may be possible, for example N instead of B.

EXAMPLES

The following is a more detailed description of the present invention with reference to working examples for prediction, synthesis of compounds and characterization of the same.

The present invention is in no way limited to the following examples.

Calculations

Structure-searching calculations were performed using the CALYPSO structure prediction method based on the global minimization of free energy using ab initio total-energy calculations. This method was benchmarked using various systems, ranging from elements to binary and ternary compounds. Total energy calculations were performed in the framework of density functional theory within the Perdew-Burke-Ernzerhof generalized gradient approximation as implemented in the VASP (Vienna Ab Initio Simulation Package) code. The projector-augmented wave (PAW) method (50) was adopted with the PAW potentials taken from the VASP library where $4s^24p^65s^2$, $2s^22p^2$ and $2s^22p^2$ are treated as valence electrons for Sr, B and C atoms, respectively. The use of a plane-wave kinetic energy cutoff of 520 eV and dense k-point sampling, adopted here, were shown to give excellent convergence of total energies. Electronic charges were calculated using a Bader charge analysis scheme using a 600×600×600 Fast Fourier Transform grid. Phonon dispersion calculations were performed to determine the dynamical stability of the predicted structures by using the finite displacement approach, as implemented in the Phonopy code. Electron-phonon coupling calculations for superconducting properties of stable phases were performed using density-functional perturbation theory (DFPT) with the Quantum-ESPRESSO package. To study interatomic interactions, crystal orbital Hamilton population (COHP) analysis was performed using the LOBSTER package.

Synthesis

Strontium metal was purified by sublimation (950° C., dynamic vacuum) onto Mo foil from a graphite crucible; graphite powder was pre-treated at 950° C. under dynamic vacuum for 16 h to remove adsorbed species. Strontium carbide ($SrC_2$) was prepared by heating 2780 g Sr (31.7 mmol) with 0.371 g graphite powder (30.9 mmol) in a capped graphite crucible under dynamic vacuum at 825° C. for 16 h. Excess Sr was subsequently sublimed at 950° C. and the resulting, pale grey $SrC_2$ powder (1.400 g, 81% yield) isolated from the crucible under Ar. Powder XRD showed a small SrO impurity. $SrB_6$ (EPSI Metals, 99.5%) and glassy carbon (Sigma Aldrich, 99.95%) were purchased commercially and used without further purification. Binary ($SrB_6+3SrC_2$) and ternary ($SrB_6+SrC_2+4C$) mixtures were prepared under an inert Ar atmosphere, sealed, then milled vigorously using $Si_3N_4$ media at 600 rpm for one-minute cycles over ~12 hours. The milled powders were removed from the media in an Ar glovebox and thin plates (10 μm) were pressed between two diamond anvils with 1 mm culets, then loaded into DAC sample chambers utilizing 100-300 μm culets and Re gaskets. Ne or alumina plates served as the pressure transmitting media and thermal insulation from the diamond anvils. After being compressed to the target pressure between 50-150 GPa, samples were heated to ~2500 K using the double-sided laser heating systems at HPCAT or GSECARS.

X-Ray Diffraction

In situ X-ray diffraction patterns were collected at the Advanced Photon Source, Sector 16, HPCAT using a monochromatic wavelength of 0.4066 Å and at Sector 13, GSECARS using a monochromatic wavelength of 0.3344 Å. The X-ray beam was focused on the sample and scattered X-rays were detected using a PILATUS 1M or MARCCD detector. The sample-to-detector distance and geometrical parameters were calibrated using $CeO_2$ and $LaB_6$ standards with the DIOPTAS software. Pressure was calibrated using the equations of state of Ne and and/or $Al_2O_3$ and cross-checked using the SrO equation of state and ruby fluorescence in some samples. Rietveld refinements of XRD patterns were conducted using Powdercell and GSAS with EXPGUI.

Figure 12:
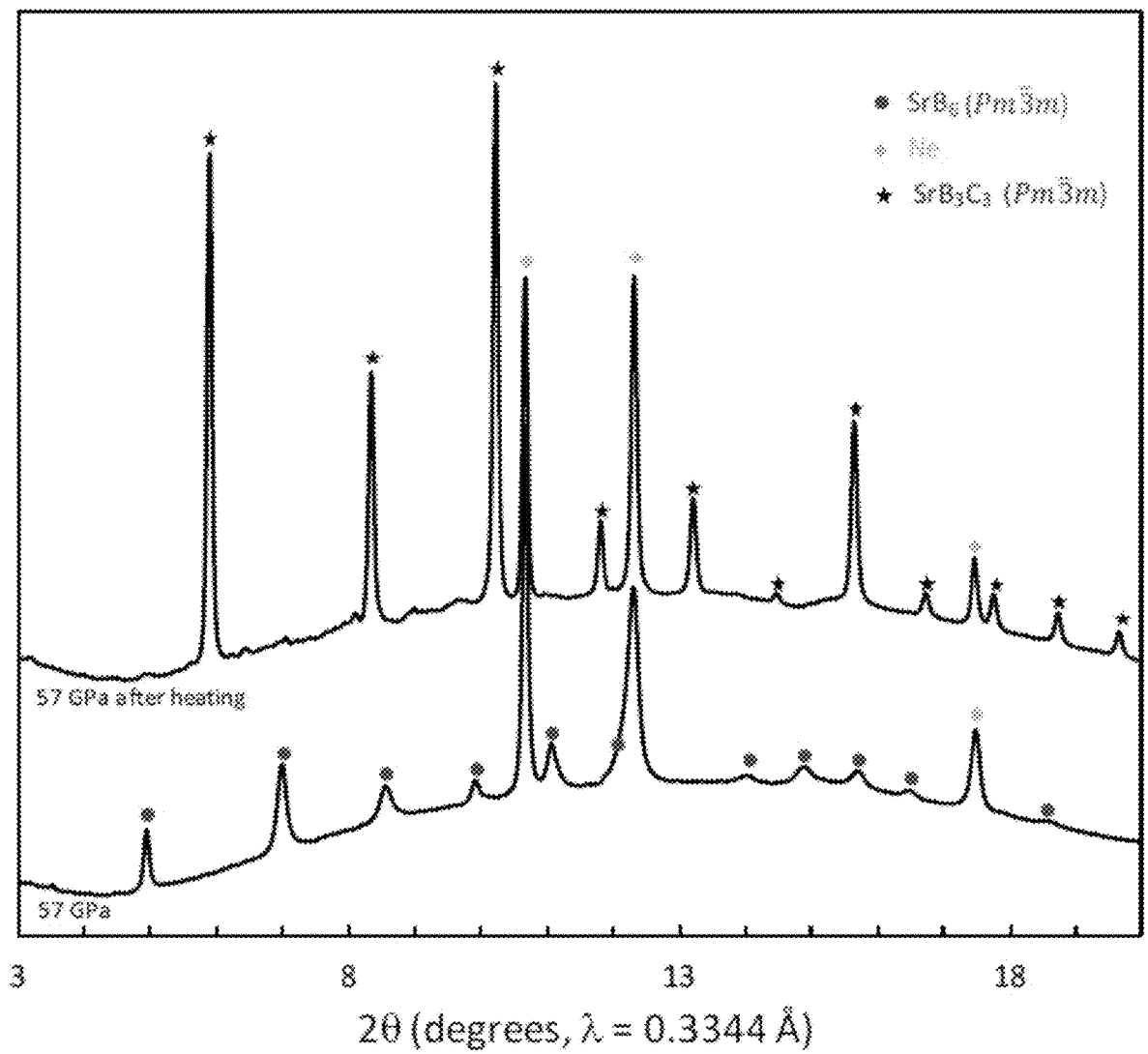
FIG. 12 provides raw XRD patterns of $SrB_3C_3$ before and after heating.

FIG. 12 provides raw XRD patterns before and after heating. The starting material is a mixture of $SrB_6$($Pm\overline{3}m$), $SrC_2$ (I4/mmm) and glassy C in a 1:1:4 molar ratio, e.g., 2Sr:6C:6B. $SrC_2$ and glassy carbon appear to be amorphous to X-rays and are not distinguishable from crystalline $SrB_6$. After heating to a maximum temperature of ~2900 K, the stoichiometric 1Sr:3C:3B mixture was converted to nearly phase pure $SrB_3C_3$ with trace residual $SrB_6$.

Figure 13:
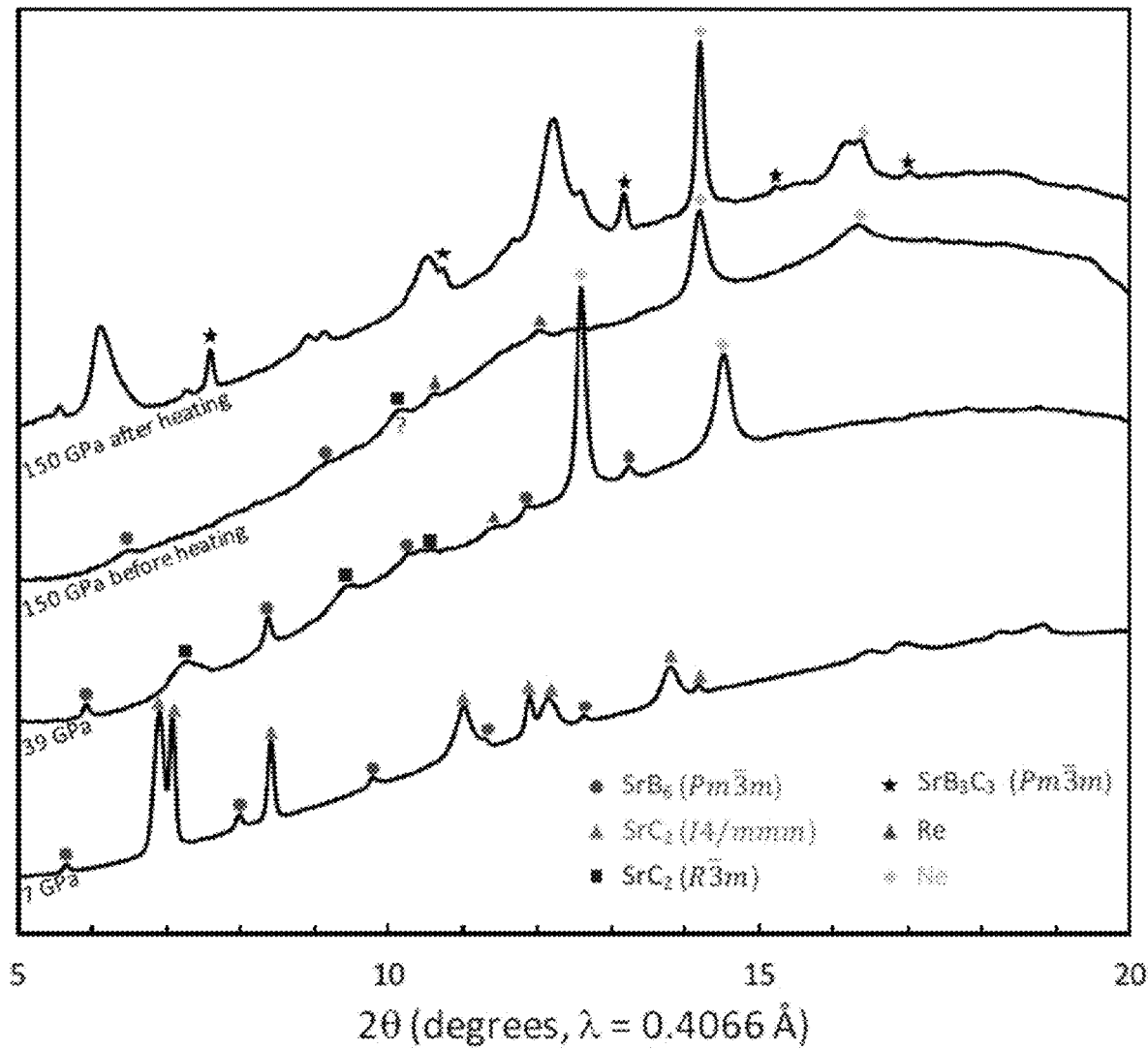
FIG. 13 provides raw XRD patterns of $SrB_3C_3$ with increasing pressure and heating.

FIG. 13 provides raw XRD patterns with increasing pressure and heating. The starting material is a mixture of $SrB_6$ ($Pm\overline{3}m$) and $SrC_2$ (I4/mmm) in a 1:3 molar ratio. Above 14 GPa, $SrC_2$ transforms to the $R\overline{3}m$ structure. All Bragg peaks broaden significantly and diminish in intensity with pressure due to significant stress accumulation prior to heating. Above ca. 50 GPa, $SrC_2$ appears to become amorphous to X-rays; one broad feature is potentially attributable to the $R\overline{3}m$ phase. After heating at ~150 GPa, many new Bragg peaks appear, which can be attributed to $SrB_3C_3$, SrBC and a high-pressure form of $SrB_6$, as described below.

Figure 14:
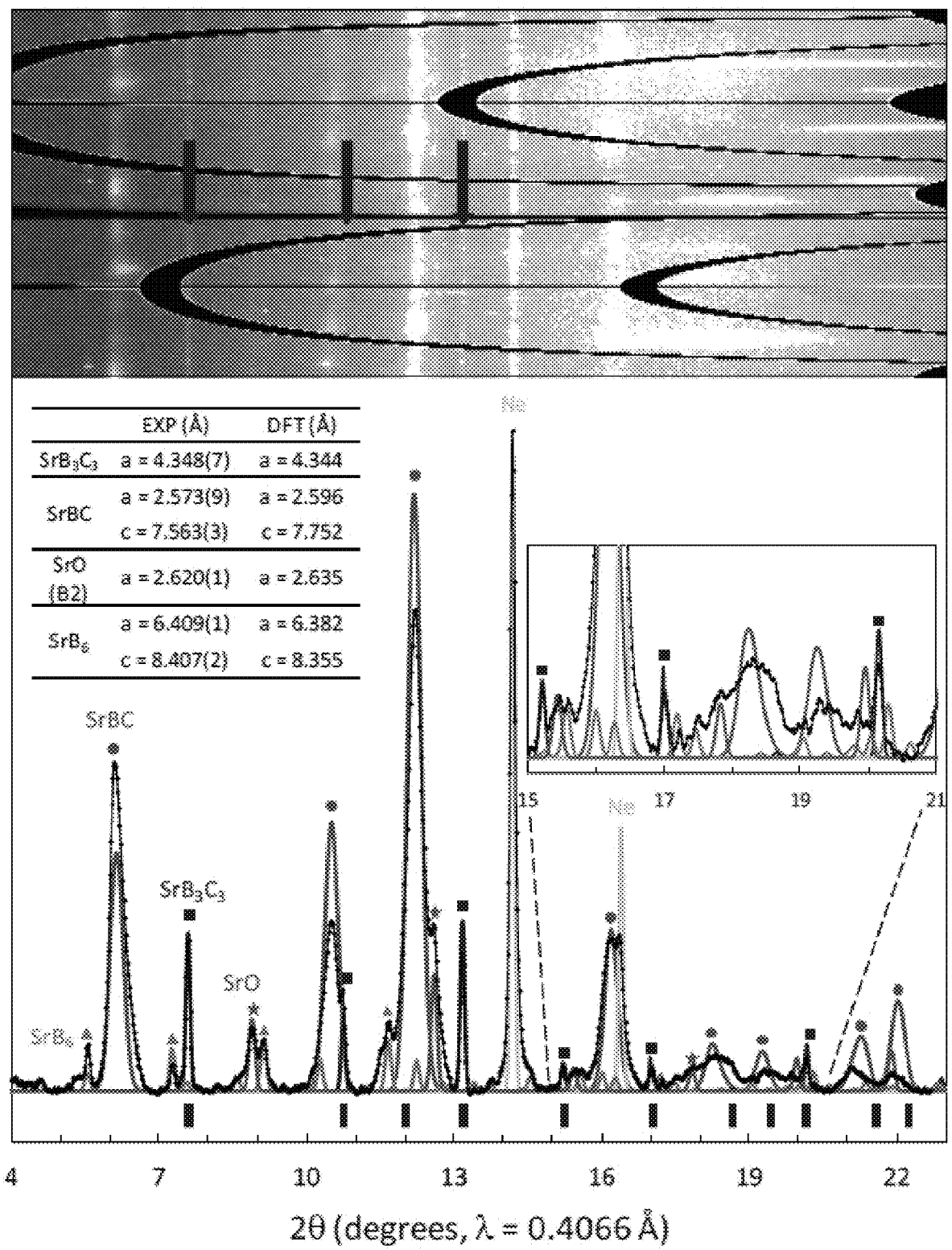
FIG. 14 provides Sr—B—C phase identification at 155(6) GPa with Ne medium.

FIG. 14 demonstrates Sr—B—C phase identification at 155(6) GPa with Ne medium. The starting material is a mixture of $SrB_6$($Pm\overline{3}m$) and $SrC_2$ (I4/mmm) in a 1:3 molar ratio. The data indicate the reaction $SrB_6+3SrC_2 \rightarrow SrB_3C_3+ 3SrBC$ (and some unconverted $SrB_6$ in a high-pressure phase), which is calculated to be the most energetically favorable reaction for these conditions. Experimental data are shown as black points connected by a thin black line. Each phase is labeled with a different symbol; tick marks below the pattern indicate allowed reflections for $SrB_3C_3$ ($Pm\bar{3}m$). Rietveld refinement was conducted using only a Gaussian peak width and scale parameter. All atomic positions were taken from DFT-optimized structures shown in Tables S1 and S2 below. Powder averaging statistics vary between phases. Experimentally refined lattice parameters are compared with DFT (PBE) optimizations at 155 GPa. The inset to the right shows quantitative intensity agreement for $SrB_3C_3$ to the limiting resolution of d=1.16 Å. The 2D cake image is presented at the top of the figure with arrows indicating prominent sharp lines for $SrB_3C_3$.

Figure 15:
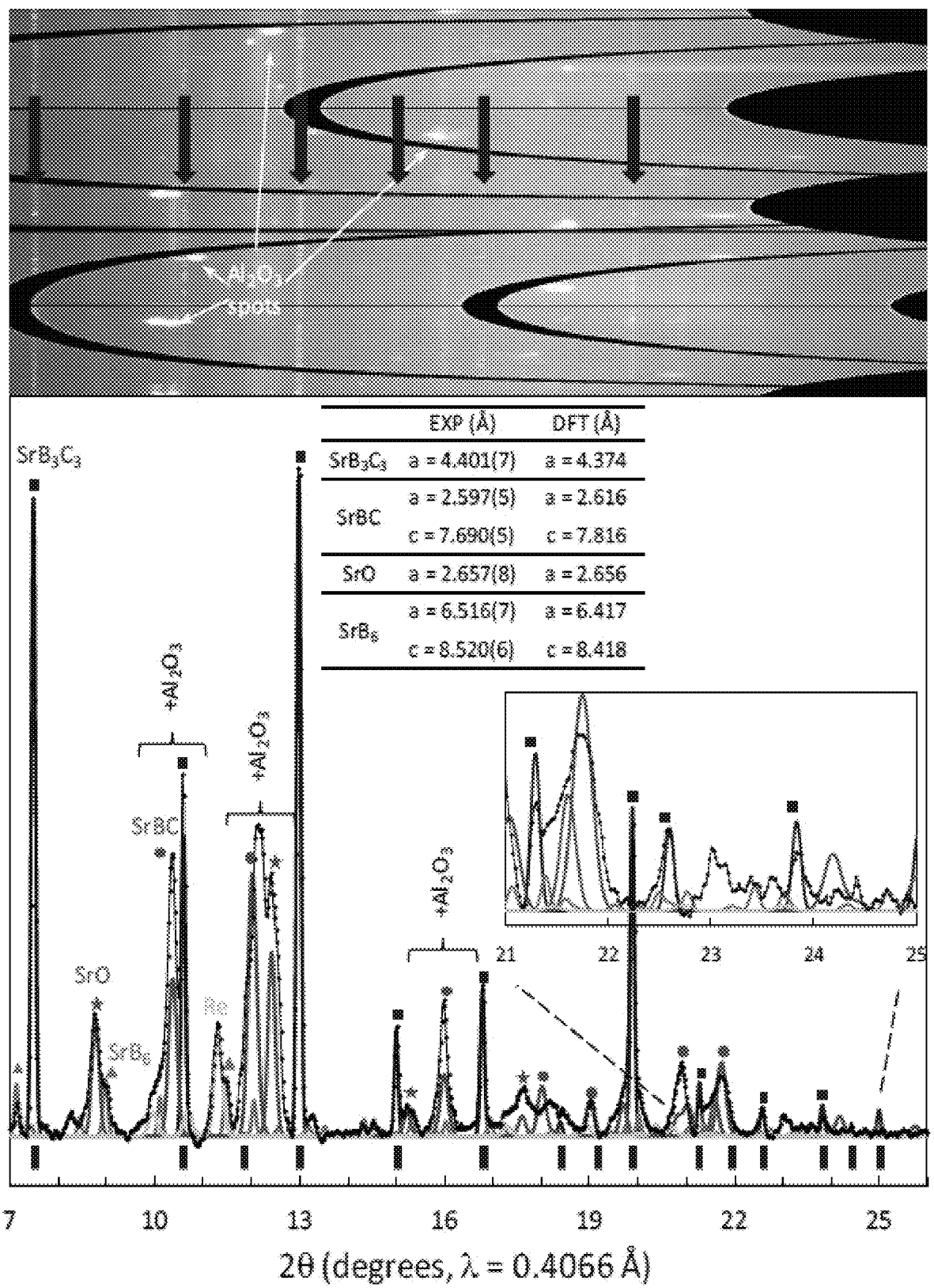
FIG. 15 provides Sr—B—C phase identification at 142 (10) GPa with $Al_2O_3$ medium.

FIG. 15 shows Sr—B—C phase identification at 142(10) GPa with $Al_2O_3$ medium. The starting material is a mixture of $SrB_6$($Pm\bar{3}m$) and $SrC_2$ (I4/mmm) in a 1:3 molar ratio. The data indicate the reaction $SrB_6 + 3SrC_2 \rightarrow SrB_3C_3 + 3SrBC$ (and some unconverted $SrB_6$ in a high-pressure phase), which is calculated to be the most energetically favorable reaction for these conditions. Experimental data are shown as black points connected by a thin black line. Each phase is labeled with a different symbol; tick marks below the pattern indicate allowed reflections for $SrB_3C_3$($Pm\bar{3}m$). Rietveld refinement was conducted using only a Gaussian peak width and scale parameter. All atomic positions were taken from DFT-optimized structures shown in Tables S1 and S2 below. Powder averaging statistics vary between phases. Experimentally refined lattice parameters are compared with DFT (PBE) optimizations at 140 GPa. The inset to the right shows quantitative intensity agreement for $SrB_3C_3$ to the limiting resolution of d=0.93 Å. The 20 cake image is presented at the top of the figure with arrows indicating prominent sharp lines for $SrB_3C_3$. Single-crystalline $Al_2O_3$ peaks were masked, but some powder intensity was unavoidable due to the breaking of crystals during compression to 140 GPa.

Figure 1B:
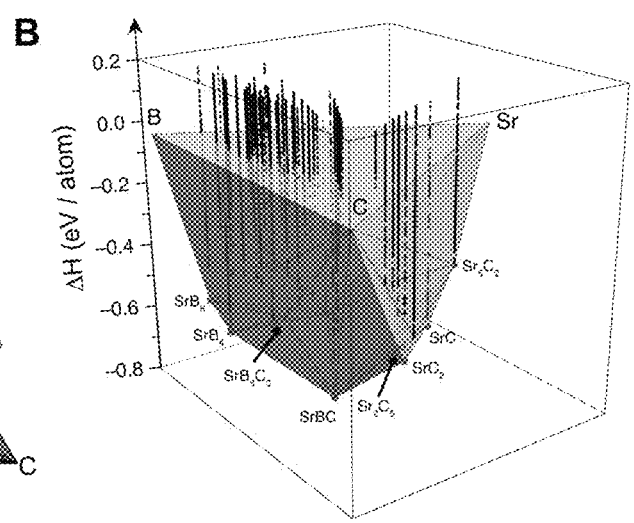
FIG. 1B is a ternary convex hull for the Sr—B—C system at 50 GPa based on formation enthalpies. Compounds with enthalpy data represented by points (red) are on the convex hull and thermodynamically stable against decomposition. Black points (the points not on the hull) show the formation enthalpies of metastable structures found in the structure searches.
Figure 16:
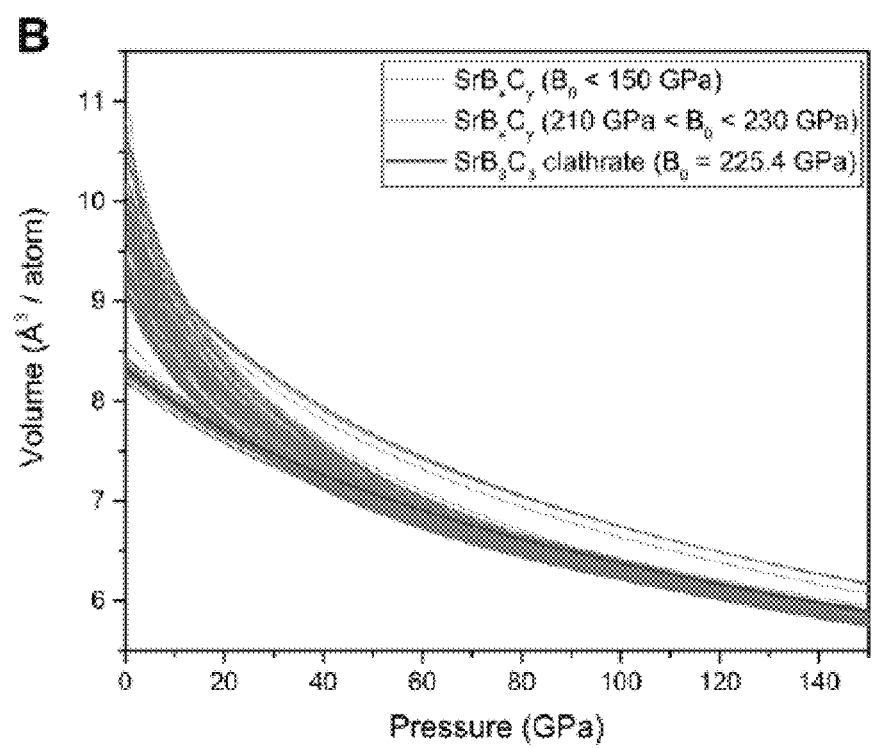
FIG. 16 presents data showing the stability of $SrB_3C_3$ and analysis of possible stoichiometries.

FIG. 16 shows stability of $SrB_3C_3$ and analysis of different possible stoichiometries. Relatedly, FIG. 1B shows predicted formation enthalpies of various Sr—B—C compounds with respect to elemental decomposition at 50 GPa. Compounds with enthalpy data represented by red points are on the convex hull and thermodynamically stable against decomposition. Black points show the formation enthalpies of metastable structures found in the CALYPSO structure searches. Blue points above the convex hull indicate the formation enthalpies of 600 additional structures containing up to 112 atoms with compositions $SrB_xC_y$ (excluding $SrB_3C_3$). These 600 structures were determined from searches wherein the Sr atoms were constrained to a tolerance within the experimentally determined cubic positions, while the C and B atoms were allowed to freely fluctuate. No composition was found to be more stable than $SrB_3C_3$. FIG. 16 shows the calculated EoS of the 600 $SrB_xC_y$ compounds presented in FIG. 1B. The red line shows the EoS of $SrB_3C_3$ clathrate, which agrees with experiment. The grey lines represent the EoS of different $SrB_xC_y$ compounds with calculated B0<150 GPa, while the cyan lines indicate the structures with calculated BC in the range of 210 to 230 GPa. After a careful analysis, we found that all the structures from the cyan group can be classified as type-VII clathrate structures (e.g., 4668 cages with different B:C compositions) whereas structures from the grey group are not cage-like structures and are more compressible. As the experimental EoS is located in the cyan group, and $SrB_3C_3$ is the lowest energy structure determined, the synthesized product is only consistent with a clathrate structure that should be identical or similar to the structure of cubic $SrB_3C_3$.

Figure 17:
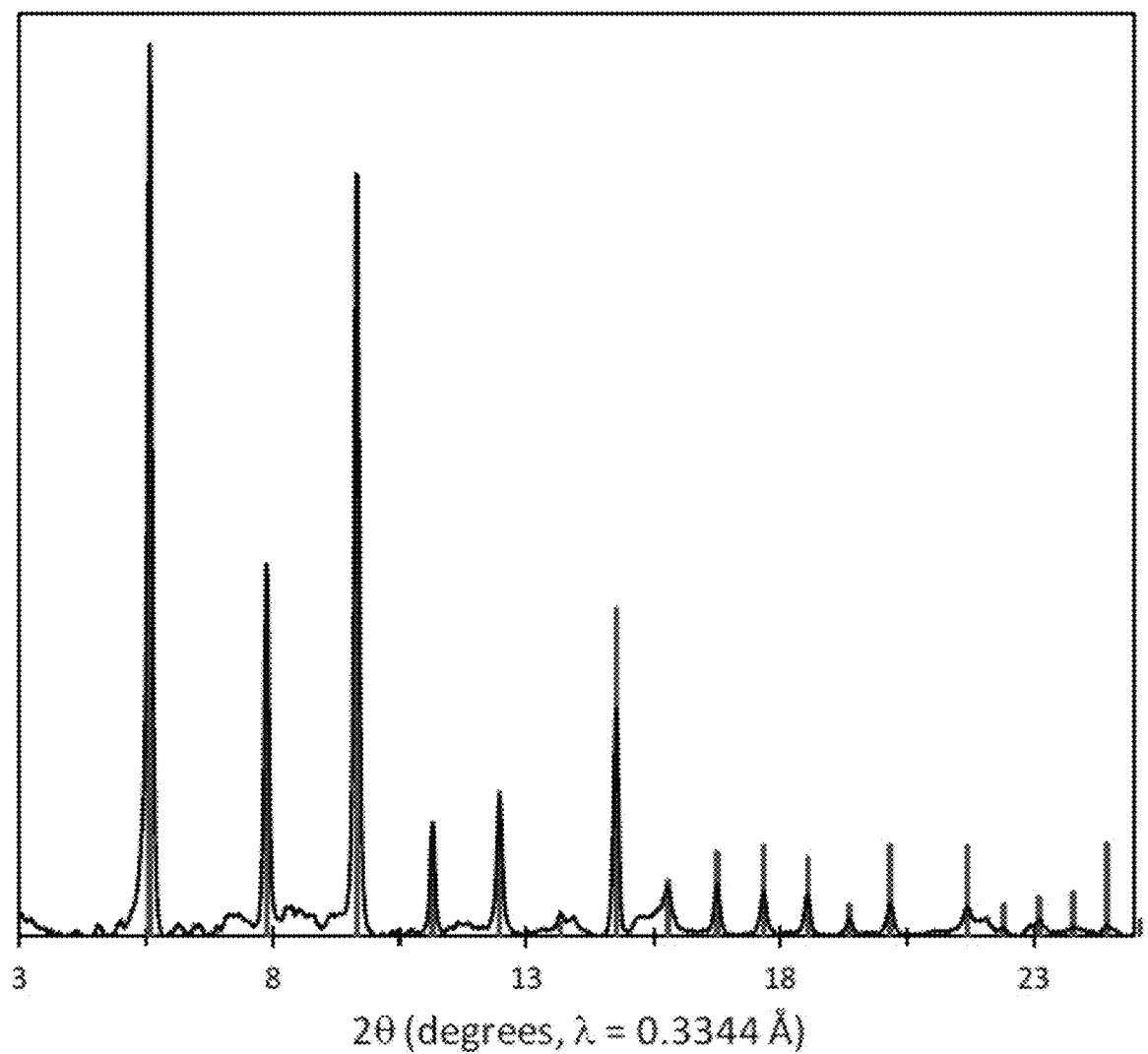
FIG. 17 shows X-ray diffraction of $SrB_3C_3$ at atmospheric pressure.

FIG. 17 shows X-ray diffraction of $SrB_3C_3$ at atmospheric pressure. After synthesis at ~57 GPa, the cell was decompressed, the neon gas was released and XRD patterns were collected after the cell was sealed at 1 atm. The refined lattice parameter of a=4.868 Å compares well with DFT-GGA calculations where a=4.88 Å. Red bars indicate calculated positions for the cubic clathrate structure. When left in open air, $SrB_3C_3$ appears to degrade and is thus sensitive to moisture and/or oxygen.

Figure 18:
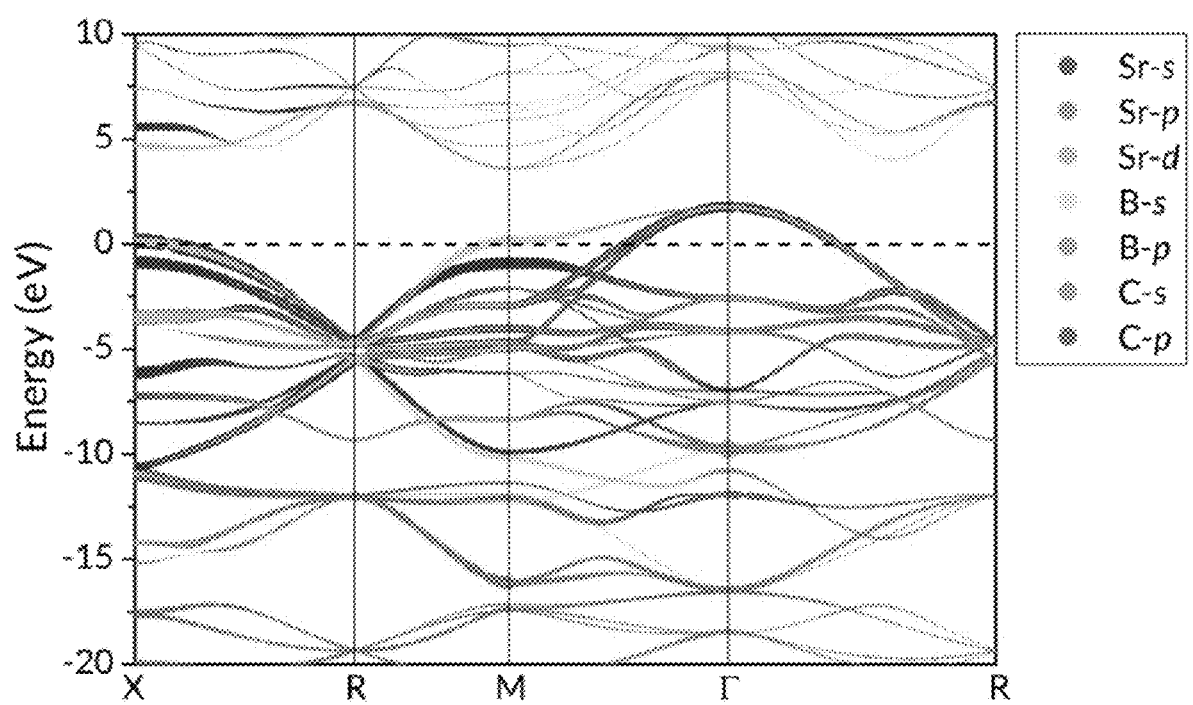
FIG. 18 provides electronic band structure for $SrB_3C_3$ at 200 GPa projected onto atomic orbitals.

FIG. 18 provides electronic band structure for $SrB_3C_3$ at 200 GPa projected onto atomic orbitals represented by different colors. The width of each band is proportional to the weight of the corresponding orbital character. The dashed line indicates the Fermi energy.

Figure 19A:
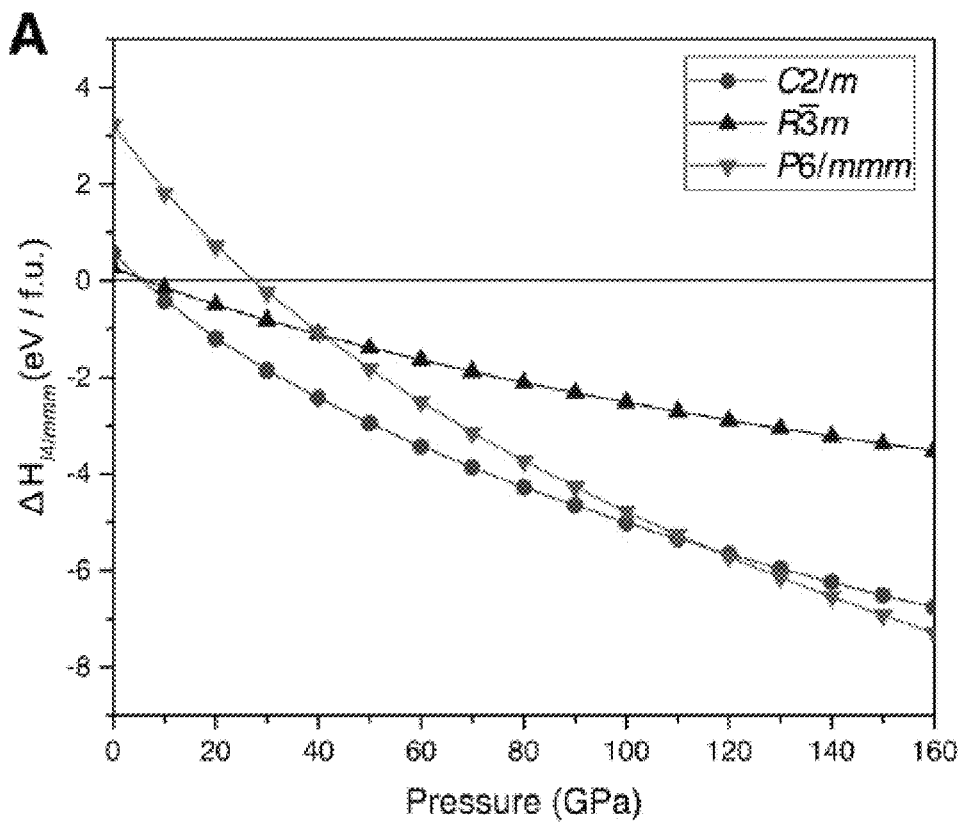
FIG. 19A and FIG. 19B provide energetic stabilities as a function of pressure, with FIG. 19A showing calculated enthalpies per $SrC_2$ unit as a function of pressure for various structures with respect to I4/mmm structure, and FIG. 19B showing calculated enthalpies per $SrB_6$ unit as a function of pressure for various structures with respect to $Pm\bar{3}m$ structure.
Figure 19B:
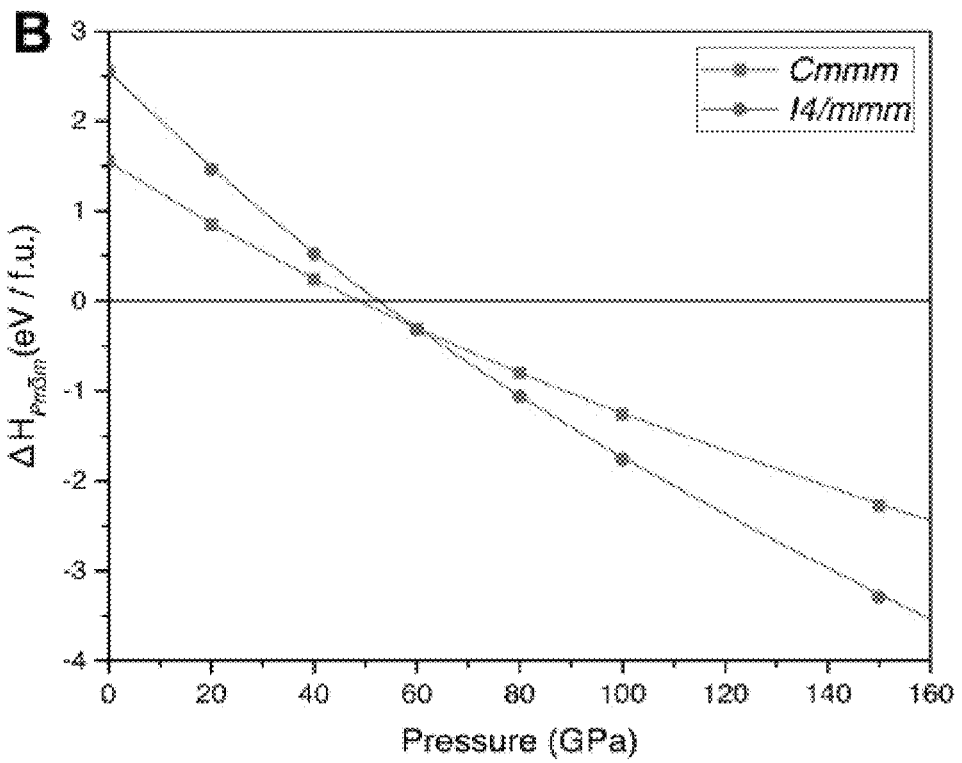

FIG. 19A and FIG. 19B provide energetic stabilities as a function of pressure. FIG. 19A shows calculated enthalpies (H) per $SrC_2$ unit as a function of pressure for various structures with respect to I4/mmm structure. FIG. 19B shows calculated enthalpies (H) per $SrB_6$ unit as a function of pressure for various structures with respect to $Pm\bar{3}n$ structure.

Figure 22:
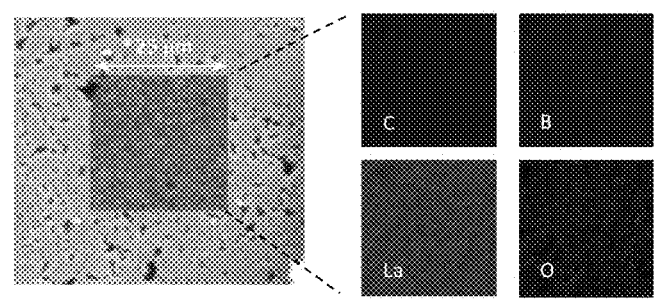
FIG. 22 provides an EDX map of recovered sample showing homogeneous elemental distribution in heated region (25×25 $\mu m^2$) with average composition $La_{1.00\pm0.07}B_{2.95\pm0.06}C_{4.20\pm0.09}O_{0.46\pm0.07}$. The carbon content is biased by adventitious sources, also observed on pure standards. The color composite map is layered over the SEM image and individual elements from the same region are shown below.

FIG. 22 provides an EDX map of recovered sample showing homogeneous elemental distribution in heated region (25×25 μm$^2$) with average composition $La_{1.00\pm0.07}B_{2.95\pm0.06}C_{4.20\pm0.09}O_{0.46\pm0.07}$. The carbon content is biased by adventitious sources, also observed on pure standards. The color composite map is layered over the SEM image and individual elements from the same region are shown below.

Table 1 provides single-crystal diffraction and refinement paramters obtained from $LaB_3C_3$ crystal synthesized at 57 Gpa and >3000 K. The analysis confirms the bipartite sodalite framework and primitive cubic space group.

TABLE 1

Structural Information for $LaB_3C_3$ from high-pressure single-crystal X-ray diffraction.

| Empirical formula | $LaB_3C_3$ |
|---|---|
| Formula weight | 207.37 |
| T/K | 293(2) |
| Crystal system | cubic |
| Space group | $Pm\bar{3}n$ |
| a/Å | 4.6712(16) |
| V/Å$^3$ | 101.93(10) |
| Z | 2 |
| $\rho_{calc}$/g · cm$^{-3}$ | 6.757 |
| μ/mm$^{-1}$ | 20.514 |
| F(000) | 180.0 |
| Crystal size/mm$^3$ | 0.005 × 0.005 × 0.005 |
| Radiation | synchrotron (λ = 0.40663) |
| 2Θ range for data collection/° | 9.988 to 29.844 |
| Index ranges | −4 ≤ h ≤ 5, |
|  | −4 ≤ k ≤ 4, |
|  | −4 ≤ l ≤ 3 |
| Reflections collected | 81 |
| Independent reflections | 21 [$R_{int}$ = 0.0452, |
|  | $R_{sigma}$ = 0.0280] |
| Data/restraints/parameters | 21/0/4 |
| Goodness-of-fit on F$^2$ | 1.109 |
| Final R indexes [I >= 2$_\sigma$ (I)] | $R_1$ = 0.0290, w$R_2$ = 0.0633 |
| Final R indexes [all data] | $R_1$ = 0.0297, w$R_2$ = 0.0658 |
| Largest diff. peak/hole/eÅ$^{-3}$ | +0.79/−0.77 |

As the present invention may be embodied in several forms without departing from the spirit or essential characteristics thereof, it will be understood that the invention is not limited by the details of the foregoing description, unless otherwise specified, but rather should be construed broadly within its spirit and scope as defined in the appended claims, and therefore all changes and modifications that fall within the metes and bounds of the claims. Accordingly, the invention is defined by the appended claims wherein:

What is claimed is:

1. A carbon-based clathrate compound comprising:
   (i) a clathrate lattice with atoms of at least one element selected from the group consisting of carbon and boron as a host cage structure;
   (ii) guest atoms encapsulated within the cages of the clathrate lattice; and
   (iii) substitution atoms that are substituted for at least one portion of the carbon and boron atoms that constitute the clathrate lattice, wherein:
   the guest atoms are Sr.

2. The carbon-based clathrate compound of claim 1, wherein the clathrate lattice is formed of sp3 hybridized carbon and boron.

3. The carbon-based clathrate compound of claim 1, wherein the structure of the carbon-based clathrate is cubic bipartite sodalite.

4. The carbon-based clathrate compound of claim 1, wherein the clathrate lattice comprises cages, each cage comprising 24 atoms with six four-sided faces and eight six-sided faces.

5. A compound of the formula $SrB_3C_3$ wherein the compound is a carbon-based clathrate compound comprising:
   (i) a clathrate lattice with atoms of at least one element selected from the group consisting of carbon and boron as a host cage structure; and
   (ii) Sr guest atoms encapsulated within the clathrate lattice.

6. A compound of the formula $CaB_3C_3$ wherein the compound is a carbon-based clathrate compound comprising:
   (i) a clathrate lattice with atoms of at least one element selected from the group consisting of carbon and boron as a host cage structure; and
   (ii) Ca quest atoms encapsulated within the clathrate lattice.

7. A compound of the formula $BaB_3C_3$ wherein the compound is a carbon-based clathrate compound comprising:
   (i) a clathrate lattice with atoms of at least one element selected from the group consisting of carbon and boron as a host cage structure; and
   (ii) Ba quest atoms encapsulated within the clathrate lattice.

* * * * *